(12) United States Patent
Mitsutani

(10) Patent No.: US 10,003,193 B2
(45) Date of Patent: Jun. 19, 2018

(54) POWER SUPPLY SYSTEM

(71) Applicant: Toyota Jidosha Kabushiki Kaisha, Toyota-shi Aichi-ken (JP)

(72) Inventor: Noritake Mitsutani, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 399 days.

(21) Appl. No.: 14/750,243

(22) Filed: Jun. 25, 2015

(65) Prior Publication Data
US 2016/0013644 A1 Jan. 14, 2016

(30) Foreign Application Priority Data
Jul. 10, 2014 (JP) ................... 2014-142100

(51) Int. Cl.
*H02J 1/14* (2006.01)
*H02J 7/00* (2006.01)
(Continued)

(52) U.S. Cl.
CPC ............... *H02J 1/14* (2013.01); *B60L 3/003* (2013.01); *B60L 3/0046* (2013.01); *B60L 3/04* (2013.01); *B60L 7/14* (2013.01); *B60L 11/005* (2013.01); *B60L 11/14* (2013.01); *B60L 11/1803* (2013.01); *B60L 11/1859* (2013.01); *B60L 11/1861* (2013.01); *B60L 15/007* (2013.01); *B60L 15/20* (2013.01); *B60L 15/2009* (2013.01); *H02J 7/00* (2013.01); *B60L 2210/14* (2013.01); *B60L 2210/40* (2013.01); *B60L 2240/421* (2013.01); *B60L 2240/423* (2013.01); *B60L 2240/525* (2013.01); *B60L 2240/527* (2013.01); *B60L 2240/545* (2013.01); *B60L 2240/547* (2013.01); *B60L 2240/549* (2013.01); *Y02T 10/645* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7225* (2013.01);
(Continued)

(58) Field of Classification Search
CPC ........................................................ H02J 1/14
USPC ......................................................... 307/31
See application file for complete search history.

(56) References Cited

U.S. PATENT DOCUMENTS

| 2009/0273235 A1* | 11/2009 | Ichikawa ............ B60L 11/1851 307/9.1 |
| 2010/0127665 A1* | 5/2010 | Mitsutani ............... B60K 6/365 320/137 |

FOREIGN PATENT DOCUMENTS

JP        2011-097693 A        5/2011

\* cited by examiner

*Primary Examiner* — Joseph Chang
(74) *Attorney, Agent, or Firm* — Dinsmore & Shohl LLP

(57) ABSTRACT

A power supply includes a load, an electric power line connected to the load, first and second DC power supplies which supply electric power to the load, an electric power converter connected between the electric power line and the first and the second DC power supplies, and a controller controlling the electric power converter. The first DC power supply serves for a voltage control, while the second DC power supply serves for an electric power control. The controller sets a difference between an electric power requested by the load and target output electric power of the first DC power supply as target output electric power of the second DC power supply, and compensates the target output electric power of the first DC power supply in accordance with a difference between the actual and the target output electric powers of the second DC power supply.

12 Claims, 14 Drawing Sheets

(51) Int. Cl.
 *B60L 3/00* (2006.01)
 *B60L 3/04* (2006.01)
 *B60L 7/14* (2006.01)
 *B60L 11/00* (2006.01)
 *B60L 11/14* (2006.01)
 *B60L 11/18* (2006.01)
 *B60L 15/00* (2006.01)
 *B60L 15/20* (2006.01)
(52) U.S. Cl.
 CPC ........ *Y02T 10/7241* (2013.01); *Y02T 10/7275* (2013.01); *Y02T 10/92* (2013.01)

FIG. 2

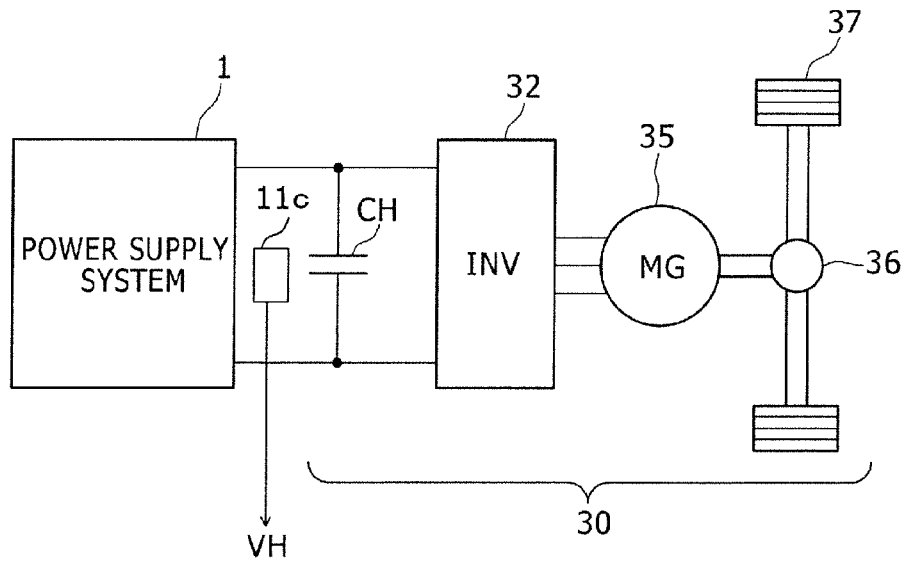

FIG. 3

| OPERATION MODE | POWER SUPPLY TO BE USED | OUTPUT VOLTAGE | S1 | S2 | S3 | S4 |
|---|---|---|---|---|---|---|
| PB | 10a AND 10b (PARALLEL) | VH→VH* | PWM CONTROL | | | |
| SB | 10a AND 10b (SERIES) | VH→VH* | PWM CONTROL | | | |
| aB | 10a ALONE | VH→VH* | PWM CONTROL | | | |
| bB | 10b ALONE | VH→VH* | PWM CONTROL | | | |
| PD | 10a AND 10b | VH=Va=Vb | ON | ON | OFF | ON |
| SD | 10a AND 10b | VH=Va+Vb | ON | OFF | ON | OFF |
| aD | 10a ALONE | VH=Va (Va>Vb) | ON | ON | OFF | OFF |
| bD | 10b ALONE | VH=Vb (Vb>Va) | ON | OFF | OFF | ON |
| PBD | 10a AND 10b (PARALLEL, 10a BOOSTED, 10b DIRECTLY CONNECTED) | VH=Vb (Vb>Va) | ON | PWM CONTROL | | ON |

|  | LOGICAL EXPRESSIONS |
|---|---|
| SG1 | /SDa or /SDb |
| SG2 | /SDa or SDb |
| SG3 | SDa or SDb |
| SG4 | SDa or /SDb |

| | LOGICAL EXPRESSIONS |
|---|---|
| SG1 | FIXED AT HIGH LEVEL |
| SG2 | /SDa |
| SG3 | SDa |
| SG4 | FIXED AT HIGH LEVEL |

| OPERATION MODE | ELECTRIC POWER DISTRIBUTION RATIO k | VH SETTABLE RANGE |
|---|---|---|
| PB | CONTROLLABLE | $\max(Va, Vb9) \sim VHmax$ |
| SB | $\dfrac{Va}{Va+Vb}$ | $Va+Vb \sim VHmax$ |
| aB | 1.0 | $\max(Va, Vb) \sim VHmax$ |
| bB | 0 | $\max(Va, Vb) \sim VHmax$ |
| PD | $\dfrac{Rb}{Ra+Rb}$ | $=Va(=Vb)$ |
| SD | $\dfrac{Va}{Va+Vb}$ | $=Va+Vb$ |
| aD | 1.0 | $=Va$ |
| bD | 0 | $=Vb$ |
| PBD | CONTROLLABLE WITHIN A PREDETERMINED RANGE | $=Vb$(or $Va$) |

| VOLTAGE RANGE | VR1 | VR2 | VR3 |
|---|---|---|---|
| APPLICABLE MODE | aD,bD,PD,PBD | aB<br>bB<br>PB<br>SD | PB<br>SB<br>aB<br>bB |

DC POWER SUPPLY 10b

DC POWER SUPPLY 10a

POWER SUPPLY SYSTEM

PRIORITY INFORMATION

This application claims priority to Japanese Patent Application No. 2014-142100, filed on Jul. 10, 2014, the entire disclosure of which is incorporated herein by reference.

TECHNICAL FIELD

The present invention relates to a power supply system which includes an electric power converter connected between two or more DC power supplies and a common power line.

BACKGROUND ART

JP 2011-97693 A (hereinafter referred to as "Patent Document 1") discloses a conventional power supply system for a vehicle in which two DC power supplies are connected in parallel to an electric power line, via respective converters. In this power supply system, one of the DC power supplies is controlled by voltage and the other DC power supply is controlled by electric power by a feedback control such that the electric power requested from a motor (load) is supplied by the combination of these two DC power supplies. Further, in the power supply system, an electric power target value which is set to the other DC power supply in accordance with an electric power distribution ratio is compensated in accordance with a deviation between an electric power command value requested to this DC power supply and an actual electric power value which is actually input and output. Patent Document 1 describes that, in this way, stable power management can be achieved because the influence (such as overdischarging and overcharging) of the DC power supply caused by the deviation between the actual electric power and the electric power command value can be eliminated.

SUMMARY

In the power supply system according to the above-described Patent Document 1, the electric power distribution ratio is determined in accordance with a state (for example, SOC(State of Charge) and temperature) of each DC power supply, a load request, and other conditions to sufficiently distribute electric power to each of the DC power supplies.

In such a power supply system, it is possible that electric power which is actually supplied to a load from a DC power supply on an electric power controlled side deviates from the electric power target value based on the electric power distribution ratio. Such a deviation may be caused by an offset error of a sensor which senses the electric current or voltage of the DC power supply. For example, with a −20 sensor offset error to a load request of 100, electric power of 80 is actually supplied from the DC power supply to the load. However, because the offset error is undetectable in the control based on a sensed value obtained from a sensor, electric power of 100 may erroneously appear to be supplied to the load.

Such an electric power deviation caused by an offset of a sensed value obtained from a sensor (in other words, a difference between the electric power target value and the actual electric power value) cannot be detected as an electric power deviation in the control, and it is impossible to eliminate such a deviation by a feedback control such as by the power supply system in Patent Document 1. Further, when the electric power supplied from a DC power supply on an electric power controlled side to a load is short with respect to the electric power distribution ratio, the shorted electric power may be obtained from the DC power supply on the voltage controlled side. Then, the electric power load share of the DC power supply on the voltage controlled side becomes larger than the targeted electric distribution ratio. As a result, the DC power supply may be continuously overpowered or underpowered (overcharged or overdischarged).

An object of the present invention is to provide a power supply system which can prevent continuous overpower or underpower of a DC power supply on a voltage controlled side, by sufficiently compensating the electric distribution ratio among two or more power supplies to thereby eliminate an electric power deviation caused by sensor characteristics or the like.

A power supply system comprises a load, an electric power line connected to the load, a first DC power supply and a second DC power supply which are capable of supplying electric power to the load, an electric power converter connected to at least one of connections between the first DC power supply and the electric power line and between the second DC power supply and the electric power line, and a controller controlling an operation of the electric power converter. The first and the second DC power supplies are connected in parallel to the electric power line. The first DC power supply serves as a power supply for an electric power control for the electric power line, while the second DC power supply serves as a power supply for a voltage control for the electric power line. The controller sets a difference between electric power requested by the load and target output electric power of the first DC power supply as target output electric power of the second DC power supply. The controller compensates the target output electric power of the first DC power supply in accordance with a difference between actual output electric power of the second DC power supply and the target output electric power of the second DC power supply.

In a power supply system according to the present invention, the controller may compensate the target output electric power of the first DC power supply by obtaining the difference between the actual output electric power of the second DC power supply and the target output electric power of the second DC power supply when an output state of the first DC power supply is stable.

In this case, the controller may obtain the difference between the actual output electric power of the second DC power supply and the target output electric power of the second DC power supply by determining that the output state of the first DC power supply is stable when the target output electric power of the first DC power supply is equal to or larger than a predetermined value and a time change ratio of the target output electric power of the first DC power supply is equal to or less than a predetermined value.

Further, in a power supply system according to the present invention, the controller may obtain a smoothed reference value by applying a smoothing process to a reference value which is obtained by dividing the difference between the actual output electric power of the second DC power supply and the target output electric power of the second DC power supply by the target output electric power of the first DC power supply, calculate a learned value which is used to perform the compensation by using the smoothed reference value, and compensate the target output electric power of the first DC power supply by using the learned value.

In this case, the controller may update the learned value by adding, after applying the smoothing process, a difference between the smoothed reference value and a previous learned value obtained in a previous process to the previous learned value, and finish the compensation of the target output electric power of the first DC power supply when the updated learned value is in a deadband defining a range including the reference value.

Further, the controller may set an upper limit and a lower limit of the updated learned value and perform the compensation of the target output electric power of the first DC power supply when the updated learned value is in a range defined by the upper limit and the lower limit, while performing no compensation when the updated value is out of the range.

With a power supply system according to the present invention, it becomes possible to prevent continuous overpower or underpower of a DC power supply on a voltage controlled side, by sufficiently compensating the electric power distribution ratio among two or more DC power supplies so as to eliminate an electric deviation caused by sensor characteristics on an electric power controlled side.

BRIEF DESCRIPTION OF THE DRAWINGS

The present invention will be further described with reference to the accompanying drawings, wherein like reference numerals refer to like parts in the several views:

FIG. 2 is a schematic diagram showing an exemplary configuration of a load shown in FIG. 1;

FIG. 3 is table describing various operation modes of an electric power converter shown in FIG. 1;

DETAILED DESCRIPTION

Embodiments according to the present invention are described in detail below with reference to the attached drawings. Because specific shapes, materials, values, direction, or the like in the description are presented as examples to facilitate understanding of the present invention, these may be changed depending on the usage, object, specifications, or any other conditions. Further, when two or more embodiments or variation examples are included below, any appropriate combinations of their features are originally expected.

Figure 1:
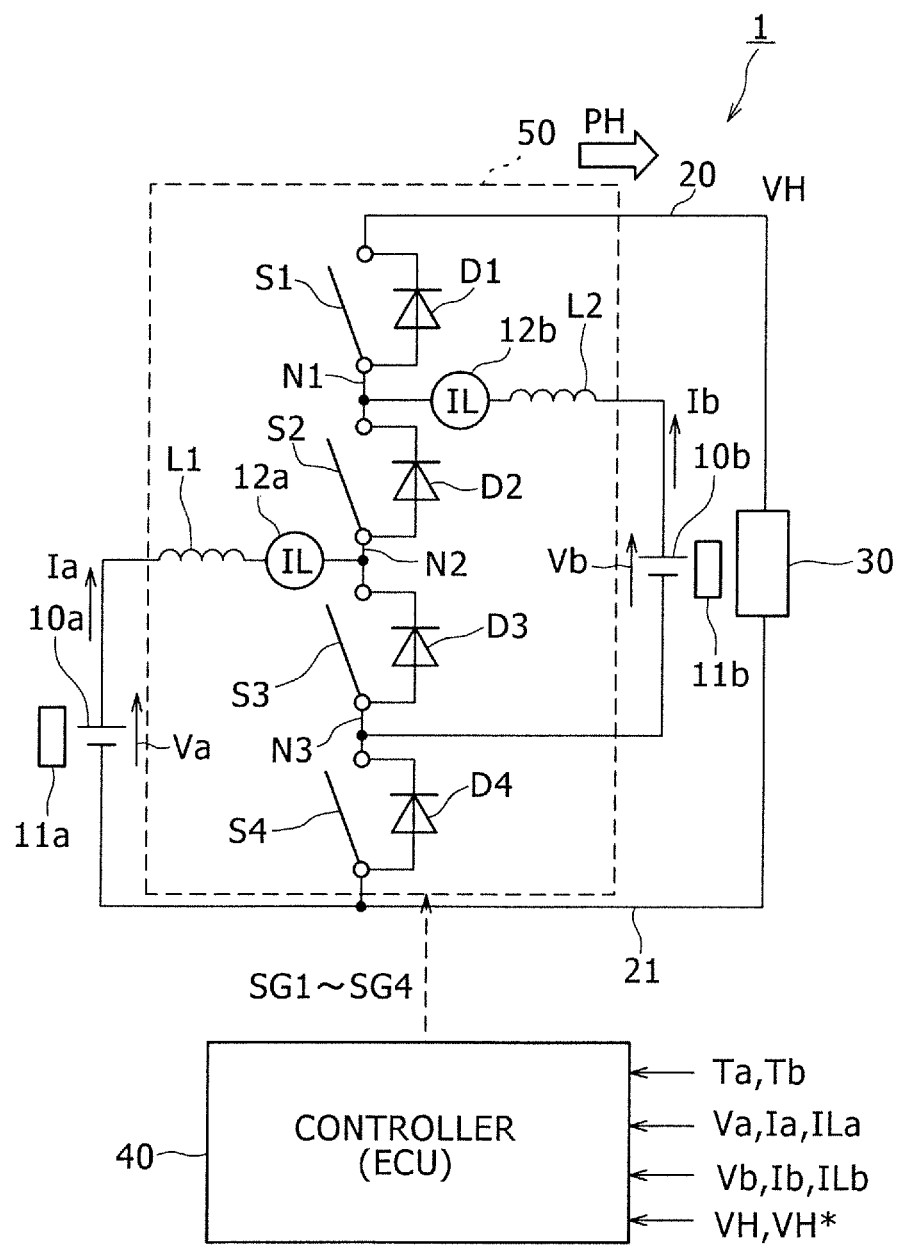
FIG. 1 is a configuration diagram showing a power supply system according to an embodiment of the present invention.

FIG. 1 shows a circuit diagram showing a configuration of a power supply system according to an embodiment of the present invention. A power supply system 1 includes a first DC power supply 10a, a second DC power supply 10b, a load 30, a controller 40 such as an electronic control unit (ECU), and an electric power converter 50.

In the present embodiment, each of the DC power supplies 10a, 10b is equipped with a secondary battery such as a lithium ion battery and/or a nickel-hydrogen battery, or a DC voltage source having excellent output characteristics such as an electric double layer capacitor or lithium ion capacitor.

The DC power supplies 10a, 10b may be formed from DC power supplies of the same type and the same capacity, or of different characteristics and different capacities.

The electric power converter 50 is connected between the DC power supplies 10a, 10b and an electric power line 20. The electric power converter 50 controls the DC voltage (hereinafter also referred to as "output voltage VH") of the electric power line 20 connected to the load 30 in accordance with a voltage command value VH*. Thus, the electric power line 20 is commonly provided for the DC power supplies 10a, 10b.

The load 30 is driven by the output voltage VH from the electric power converter 50. The voltage command value VH* is set to a voltage appropriate for driving the load 30. The voltage command value VH* is variably set in accordance with driving conditions (such as torque and rotation speed) of the load 30. Further, the load 30 may be configured to generate electric power to be charged to the DC power supplies 10a, 10b by regenerative power generation or the like.

The electric power converter 50 includes switching elements S1 to S4 and reactors L1, L2. In the present embodiment, for example, an insulated gate bipolar transistor (IGBT) may be used as each of the switching elements S1 to S4. Diodes D1 to D4 are connected in anti-parallel to the switching elements S1 to S4, respectively.

The ON/OFF statuses of the switching elements S1 to S4 can be controlled in response to respective control signals SG1 to SG4. Specifically, the switching elements S1 to S4 are turned ON when the control signals SG1 to SG4 are at a high level (hereinafter referred to as "H level"), while the switching elements S1 to S4 are turned OFF when the control signals SG1 to SG4 are at a low level (hereinafter referred to as "L level").

The switching element S1 is electrically connected between the electric power line 20 and a node N1. The reactor L2 is connected between the node N1 and a positive terminal of the DC power supply 10b. The electric current ILb flowing through the reactor L2 is sensed by an electric current sensor 12b, and the sensed electric current value is input to the controller 40. The switching element S2 is electrically connected between the node N1 and a node N2. The reactor L1 is connected between the node N2 and a positive terminal of the DC power supply 10a. The electric current ILa flowing through the reactor L1 is sensed by an electric current sensor 12a, and the sensed electric current value is input to the controller 40.

The switching element S3 is electrically connected between the node N2 and a node N3. The node N3 is electrically connected to a negative terminal of the DC power supply 10b. The switching element S4 is electrically connected between the node N3 and a ground wire 21. The ground wire 21 is electrically connected between the load 30 and a negative terminal of the DC power supply 10a.

As apparent from FIG. 1, the electric power converter 50 is equipped with a boost chopper circuit for each of the DC power supplies 10a, 10b. Specifically, a first boost chopper circuit of DC bidirectional type is formed for the DC power supply 10a such that the switching elements S1 and S2 are used as upper arm elements, while the switching elements S3 and S4 are used as lower arm elements. Similarly, a second boost chopper circuit of DC bidirectional type is formed such that the switching elements S1 and S4 are used as upper arm elements, while the switching elements S2 and S3 are used as lower arm elements.

The switching elements S1 to S4 are included in both of the electric power conversion paths, one of which is formed by the first boost chopper circuit between the DC power supply 10a and the electric power line 20, while the other is formed by the second boost chopper circuit between the DC power supply 10b and the electric power line 20.

The controller 40 generates the control signals SG1 to SG4 which control ON and OFF of the switching elements S1 to S4 in order to control the output voltage VH to the load 30. The controller 40 receives inputs of sensed values; specifically, the voltage Va of the DC power supply 10a sensed by a voltage sensor 11a, the electric current Ia flowing through the DC power supply 10a sensed by an electric current sensor (not shown), the voltage Vb of the DC power supply 10b sensed by a voltage sensor 11b, and the electric current Ib flowing through the DC power supply 10b sensed by an electric current sensor (not shown). The controller 40 also receives inputs of the temperatures Ta, Tb of the DC power supplies 10a, 10b sensed by respective temperature sensors (not shown). The controller 40 further receives inputs of the output voltage VH of the electric power converter 50 sensed by a voltage sensor 11c (refer to FIG. 2).

It should be noted that when no electric power distribution wire to an auxiliary device (such as a lamp, audio device, and air conditioner) is connected between the DC power supply 10a and the reactor L1, the electric current ILa flowing through the reactor L1 can be assumed to be equal to the electric current Ia of the DC power supply 10a. Similarly, when no electric power distribution wire to an auxiliary device is connected between the DC power supply 10b and the reactor L2, the electric current ILb flowing through the reactor L2 can be assumed to be equal to the electric current Ib of the DC power supply 10b.

FIG. 2 is a schematic diagram showing a configuration of the load 30. The load 30 is configured to include, for example, a traction electric motor used for propulsion of an electrically-driven vehicle. The load 30 includes a smoothing capacitor CH, an inverter 32, a motor generator 35, a power transmission gear 36, and drive wheels 37.

The motor generator 35 is a traction electric motor which generates the vehicle drive force. The motor generator 35 is, for example, a multi-phase permanent magnet type synchronous motor. The output torque of the motor generator 35 is transmitted to the drive wheels 37 via the power transmission gear 36, which includes a decelerator and a power distributor. The electrically-driven vehicle runs by using the torque transmitted to the drive wheels 37. The motor generator 35 generates power by using rotational force of the drive wheels 37 while the electrically-driven vehicle is in regenerative braking. The generated electric power is converted from AC power to DC power by the inverter 32 and used to charge the DC power supplies 10a, 10b in the power supply system 1.

In a hybrid vehicle with an engine (not shown) mounted in addition to the motor generator, the vehicle drive force required for driving the electrically-driven vehicle is generated by operating the engine in association with the motor generator 35. In this case, it is also possible to charge the DC power supplies 10a, 10b by using the electric power generated with the rotational force of the engine.

As described above, an "electrically-driven vehicle" indicates a vehicle mounted with a traction electric motor in general. Thus, the term indicates not only a hybrid vehicle in which vehicle drive force is generated by an engine and an electric motor, but also an electric vehicle and a fuel cell vehicle without an engine. Further, the load 30 may include one or more motor generators.

<Operation Modes of Electric Power Converter>

The electric power converter 50 provides a plurality of operations modes in which the DC power conversions are performed in different manners between the DC power supplies 10a, 10b and the electric power line 20.

FIG. 3 shows a plurality of operation modes of the electric power converter 50. As shown in FIG. 3, the operation modes are broadly divided into two mode groups, "boosting voltage modes (B)" in which the output voltage of the DC power supply 10a and/or the DC power supply 10b is boosted with periodical ON and OFF control of the switching elements S1 to S4, and "direct connection modes (D)" in which the DC power supply 10a and/or the DC power supply 10b are electrically, directly connected to the electric power line 20 with the switching elements S1 to S4 fixed to ON or OFF.

The boosting voltage modes include a "parallel boosting voltage mode (hereinafter referred to as "PB mode")" in which parallel DC-DC conversion is performed between the DC power supplies 10a, 10b and the electric power line 20, a "series boosting voltage mode (SB mode)" in which the DC-DC conversion is performed between the directly connected DC power supplies 10a, 10b and the electric power line 20, and a "parallel boosting voltage direct connection mode (PBD mode)" in which the DC-DC conversion is performed between one of the DC power supplies 10a, 10b and the electric power line 20, while the other one of the DC power supplies 10a, 10b is connected in parallel to the one of the DC power supplies, and directly to the electric power line 20. It should be noted that because the PBD mode involves a voltage boosting operation for one of the DC power supplies, the PBD mode is described below in a group of "boosting voltage (B) modes."

The boosting voltage modes further include a "DC power supply 10a alone mode (aB mode)" in which the DC-DC conversion is performed between the DC power supply 10a alone and the electric power line 20, and a "DC power supply 10b alone mode (bB mode)" in which the DC-DC conversion is performed between the DC power supply 10b alone and the electric power line 20. In the aB mode, the DC power supply 10b is electrically disconnected from the electric power line 20 and unused as long as the output voltage VH is controlled to be higher than the voltage Vb of the DC power supply 10b. Similarly, in the bB mode, the DC power supply 10a is electrically disconnected from the electric power line 20 and unused as long as the output voltage VH is controlled to be higher than the voltage Va of the DC power supply 10a.

In each of the PB mode, the SB mode, the aB mode, and the bB mode, all of which are included in the boosting voltage modes, the output voltage VH of the electric power line 20 is controlled in accordance with the voltage command value VH*. In contrast, in the PBD mode, because the DC power supply 10b is directly connected to the electric power line 20, the output voltage VH of the electric power line 20 becomes the voltage Vb of the DC power supply 10b. Such relationships are described in the "output voltage" column in the first to fourth rows and the bottom row in FIG. 3.

The direct connection modes include a "parallel direct connection mode (PD mode)" in which the DC power supplies 10a, 10b are maintained in a parallel connection to the electric power line 20, and a "series direct connection mode (SD mode)" in which the DC power supplies 10a, 10b are maintained in a series connection to the electric power line 20.

In the PD mode, the switching elements S1, S2, S4 are fixed to ON, while the switching element S3 is fixed to OFF. In this way, the output voltage VH becomes equal to the output voltages Va, Vb of the DC power supplies 10a, 10b (specifically, the higher one of Va and Vb). Because the voltage difference between Va and Vb causes a short-circuit current between the DC power supplies 10a, 10b, the PD mode may be applied only when the voltage difference is small.

In the SD mode, the switching elements S2, S4 are fixed to OFF, while the switching elements S1, S3 are fixed to ON. In this way, the output voltage VH becomes equal to the sum of the output voltages Va, Vb of the DC power supplies 10a, 10b (VH=Va+Vb).

The direct connection modes further include a "DC power supply 10a direct connection mode (aD mode)" in which the DC power supply 10a alone is electrically connected to the electric power line 20, and a "DC power supply 10b direct connection mode (bD mode)" in which the DC power supply 10b alone is electrically connected to the electric power line 20.

In the aD mode, the switching elements S1, S2 are fixed to ON, while the switching elements S3, S4 are fixed to OFF. In this way, the DC power supply 10b is disconnected from the electric power line 20 such that the output voltage VH becomes equal to the voltage Va of the DC power supply 10a (VH=Va). In the aD mode, the DC power supply 10b is electrically disconnected from the electric power line 20, and unused. When the aD mode is applied with Vb>Va, a short-circuit current flows from the DC power supply 10b to the DC power supply 10a via the switching element S2. Therefore, the aD mode may be applied only with Va>Vb.

Similar, in the bD mode, the switching elements S1, S4 are fixed to ON, while the switching elements S2, S3 are fixed to OFF. In this way, the DC power supply 10a is disconnected from the electric power line 20 such that the output voltage VH becomes equal to the voltage Vb of the DC power supply 10b (VH=Vb). In the bD mode, the DC power supply 10a is electrically disconnected from the electric power line 20, and unused. When the bD mode is applied with Va>Vb, a short-circuit current flows from the DC power supply 10a to the DC power supply 10b via the diode D2. Therefore, the bD mode may be applied only with Vb>Va.

As described in the "output voltage" column in the fifth to eighth rows in FIG. 3, in each of the PD mode, the SD mode, the aD mode, and the bD mode, all of which are included in the direct connection modes, the output voltage VH of the electric power line 20 cannot be directly controlled, because the output voltage VH depends on the voltages Va, Vb of the DC power supplies 10a, 10b. Therefore, in each of the direct connection modes, the electric power loss at the load 30 may be increased because the output voltage VH cannot be set appropriately for the operation of the load 30.

However, because the switching elements S1 to S4 are not turned ON and OFF frequently in the direct connection modes, the electric power loss at the electric power converter 50 is significantly restricted. Therefore, depending on the operation status of the load 30, the electric power loss of the power supply system 1 as a whole may be reduced by applying the direct connection modes, when the decrease in the electric power loss of the electric power converter 50 is larger than the electric power loss at the load 30.

The above feature is also found with the PBD mode, which is a unique operation mode in the present embodiment. Specifically, in the PBD mode, the output voltage VH cannot be directly controlled, because one of the DC power supplies 10a, 10b is connected in parallel to the other DC power supplies 10a, 10b and directly to the electric power line 20, the output voltage VH becomes the voltage Va or Vb of the DC power supplies 10a, 10b. However, among the switching elements S1 to S4, two switching elements which correspond to the directly connected DC power supply are not turned ON and OFF frequently, and the electric power loss of the electric power converter 50 is restricted such that the electric power loss of the power supply system 1 as a whole may be restricted by applying the PBD mode depending on the operation state of the load 30.

In the power supply system 1 according to the present embodiment, it is preferable that the DC power supply 10a is, for example, a high-output type power supply and the DC power supply 10b is a high-capacity type power supply. In this way, in an electrically-driven vehicle, it becomes possible to respond to a rapid acceleration request from a driver through an accelerator operation with an output from a high-output type DC power supply 10a, while it is also possible to respond to a request which requires a relatively low power for a long period of time such as a constant high speed driving with an output from a high-capacity type DC power supply 10b. In such an electrically-driven vehicle, by using the energy stored in the high-capacity type DC power supply 10b for a long period of time, it becomes possible not only to increase the driving distance on the electric energy but also to quickly provide an acceleration performance in response to the accelerator operation by the driver.

However, when the batteries are formed with DC power supplies, output characteristics may be lowered at a low temperature, or the charge and discharge may be limited in order to restrict deterioration progress at a high temperature. Therefore, in the power supply system 1, when the charge and discharge of the DC power supplies 10a, 10b are limited, a process to limit the output electric power PH of the electric power line 20 in response to the electric power request from the load 30 is performed to avoid excessive charge or discharge beyond a limit value. This process is described in detail further below.

<Boosting Voltage Operation in PB Mode>

Figure 4A:
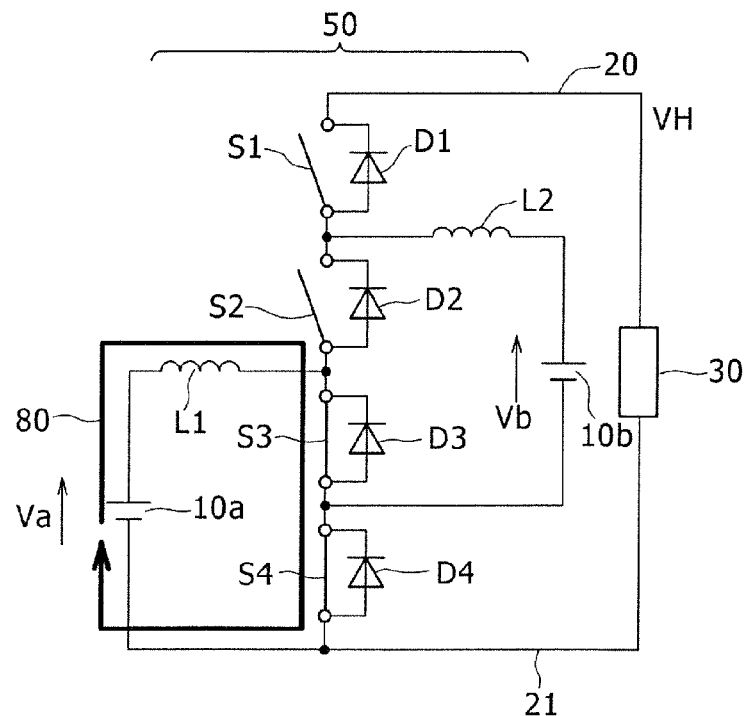
FIG. 4A is a circuit diagram prepared to describe a DC-DC conversion (boosting voltage operation) applied to a first DC power supply in a parallel boosting voltage (PB) mode.
Figure 4B:
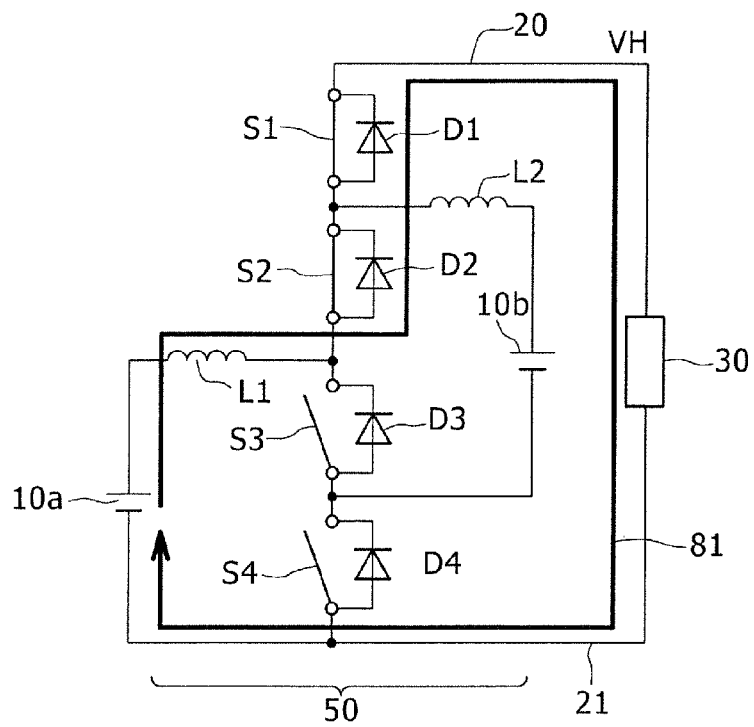
FIG. 4B is a circuit diagram prepared to describe a DC-DC conversion (boosting voltage operation) applied to a first DC power supply in the PB mode.

Next, with reference to FIGS. 4A, 4B, 5A and 5B, a boosting voltage operation in the PB mode is described in detail below. FIGS. 4A and 4B show the DC-DC conversion (boosting voltage operation) applied to the DC power supply 10a in the PB mode. As shown in FIG. 4A, an electric current path 80 through which energy is stored in the reactor L1 is formed by turning ON the pair of the switching elements S3, S4 and turning OFF the pair of the switching elements S1, S2. In this way, a chopper circuit with the lower arm elements turned ON is formed for the DC power supply 10a.

In contrast, as shown in FIG. 4B, an electric current path 81 through which the energy stored in the reactor L1 is output with the energy of the DC power supply 10a is formed by turning OFF the pair of the switching elements S3, S4 and turning ON the pair of the switching elements S1, S2. In this way, a chopper circuit with the upper arm elements turned ON is formed for the DC power supply 10a. Under these conditions, electric current flows in the electric current path 81 through the diodes D1, D2. Thus, the switching elements S1, S2 function as switches to form an electric current path through which the regenerated electric power from the load 30 is charged to the DC power supply 10a.

As described above, by alternatively repeating a first period in which the pair of the switching elements S3, S4 are turned ON while at least one of the pair of the switching elements S1, S2 is turned OFF, and a second period in which the pair of the switching elements S1, S2 are turned ON, while at least one of the pair of the switching elements S3, S4 is turned OFF, a boost chopper circuit for the DC power supply 10a is formed. It should be noted here that, in the DC-DC conversion shown in FIGS. 4A and 4B, because no electric current path to the DC power supply 10b is formed, the DC power supplies 10a, 10b do not interfere with each other. Thus, the input and output of the electric power can be controlled independently for the DC power supplies 10a, 10b.

In the above-described DC-DC conversion, the relationship between the voltage Va of the DC power supply 10a and the output voltage VH of the electric power line 20 can be defined in the following Equation (1):

$$VH = 1/(1-Da) \times Va \tag{1}$$

where Da represents the duty ratio of the period in which the pair of the switching elements S3, S4 are turned ON.

Figure 5A:
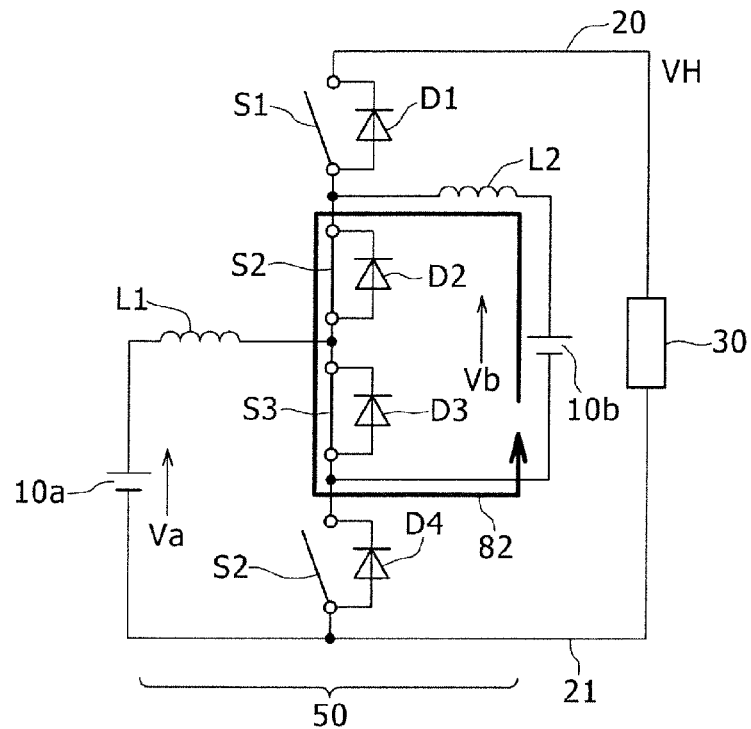
FIG. 5A is a circuit diagram prepared to describe a DC-DC conversion (boosting voltage operation) applied to a second DC power supply in the PB mode.
Figure 5B:
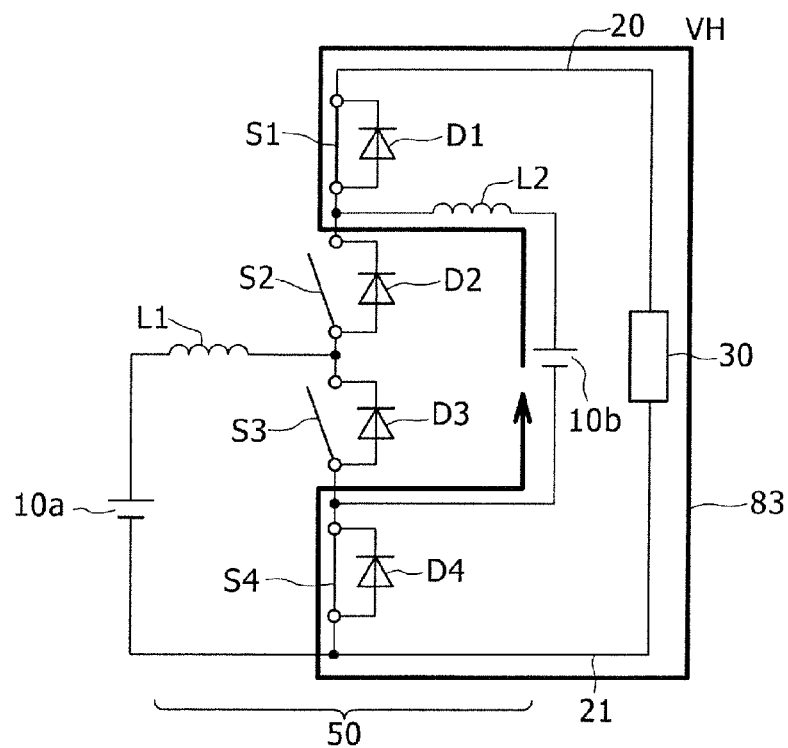
FIG. 5B is a circuit diagram prepared to describe a DC-DC conversion (boosting voltage operation) applied to a second DC power supply in the PB mode.

FIGS. 5A and 5B show the DC-DC conversion (boosting voltage operation) applied to the DC power supply 10b in the PB mode. As shown in FIG. 5A, an electric current path 82 through which energy is stored in the reactor L2 is formed by turning on the pair of the switching elements S2, S3 and turning OFF the pair of the switching elements S1, S4. In this way, a chopper circuit with the lower arm elements turned ON is formed for the DC power supply 10b.

In contrast, as shown in FIG. 5B, an electric current path 83 through which the energy stored in the reactor L2 is output with the energy of the DC power supply 10b is formed by turning OFF the pair of the switching elements S2, S3 and turning ON the pair of the switching elements S1 and S4. In this way, a chopper circuit with upper arm elements turned ON is formed for the DC power supply 10b. Under these conditions, electric current flows in the electric current path 83 through the diode D1. Thus, the switching element S1 functions as a switch to form an electric current path through which the regenerated electric power from the load 30 is charged to the DC power supply 10b.

By alternatively repeating a first period in which the pair of the switching elements S2, S3 are turned ON while at least one of the pair of the switching elements S1 and S4 is turned OFF, and a second period in which the pair of the switching elements S1 and S4 are turned ON while at least one of the pair of the switching elements S2, S3 is turned OFF, a boost chopper circuit for the DC power supply 10b is formed. It should be noted here that, in the DC-DC conversion shown in FIGS. 5A and 5B, because no electric current path to the DC power supply 10a is formed, the DC power supplies 10a, 10b do not interfere with each other. Thus, the input and output of the electric power can be controlled independently for the DC power supplies 10a, 10b.

In the above-described DC-DC conversion, the relationship between the voltage Vb of the DC power supply 10b and the output voltage VH of the electric power line 20 can be defined in the following Equation (2):

$$VH = 1/(1-Db) \times Vb \tag{2}$$

where Db represents the duty ratio of the period in which the pair of the switching elements S2, S3 are turned ON.

Figures 6, 7:
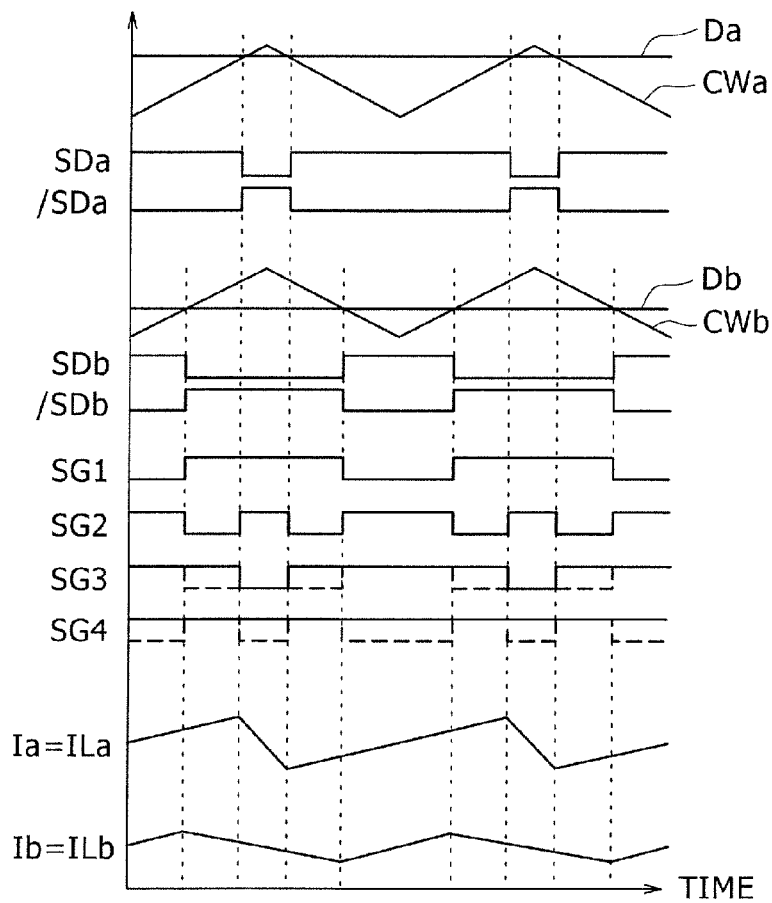
FIG. 6 is a waveform diagram showing an exemplary control operation of switching elements of the electric power converter in the PB mode.
FIG. 7 is a table showing logical expressions which are used to set control signals of each switching element in the PB mode.

FIG. 6 is a waveform diagram showing an exemplary control operation of the switching elements in the PB mode. FIG. 6 shows a case assuming that a carrier wave CWa used for the pulse width modulation (PWM) control of the DC power supply 10a and a carrier wave CWb used for the PWM control of the DC power supply 10b have the same frequency and the same phase.

As referring to FIG. 6, in the PB mode, for example, the output of one of the DC power supplies 10a, 10b may be controlled (voltage control) to compensate the voltage deviation ΔVH of the output voltage VH (ΔVH=VH*−VH), and the output of the other one of the DC power supplies 10a, 10b can be controlled (electric current control) to compensate the electric current deviation of the electric currents Ia, Ib. Under such conditions, the command value of the electric current control (Ia* or Ib*) may be set to control the output electric power of that DC power supply.

As one example, in a case where the output of the DC power supply 10b is controlled by voltage, while the output of the DC power supply 10a is controlled by electric current, the duty ratio Da is calculated based on the electric current deviation ΔIa (ΔIa=Ia*−Ia), while the duty ratio Db is calculated based on the voltage deviation ΔVH.

A control pulse signal SDa is generated based on a comparison between the duty ratio Da used to control the output of the DC power supply 10a and the carrier wave CWa. Similarly a control pulse signal SDb is generated based on a comparison between the carrier wave CWb and the duty ratio Db used to control the output of the DC power supply 10b. The control pulse signals /SDa and /SDb are inversion signals of the control pulse signals SDa and SDb.

As shown in FIG. 7, the control signals SG1 to SG4 are set in accordance with logical expressions of the control pulse signals SDa (/SDa) and SDb (/SDb). Specifically, the switching element S1 forms an upper arm element in each of the boost chopper circuits shown in FIGS. 4A to 5B. Thus, the control signal SG1 used to control the ON and OFF of the switching element S1 is generated by the logical sum of the control pulse signals /SDa and /SDb.

The switching element S2 forms an upper arm element in the boost chopper circuits shown in FIGS. 4A and 4B, and a lower arm element in the boost chopper circuits shown in FIGS. 5A and 5B. Thus, the control signal SG2 used to control the ON and OFF of the switching element S2 is generated by the logical sum of the control pulse signals /SDa and SDb.

The switching element S3 forms a lower arm element in each of the boost chopper circuits shown in FIGS. 4A to 5B. Thus, the control signal SG3 used to control the ON and OFF of the switching element S3 is generated by the logical sum of the control pulse signals SDa and SDb.

The switching element S4 forms a lower arm element in the boost chopper circuits shown in FIGS. 4A and 4B, and an upper arm element in the boost chopper circuits shown in FIGS. 5A and 5B. Thus, the control signal SG4 used to control the ON and OFF of the switching element S4 is generated by the logical sum of the control pulse signals SDa and /SDb.

As apparent from FIGS. 6 and 7, in the PB mode, the control signals SG2 and SG4 are set to be complementary levels such that the switching elements S2, S4 are complementally turned ON and OFF. Similarly, as the control signals SG1 and SG3 are set to be complementary levels, the switching elements S1, S3 are complementally turned ON and OFF. In this way, a DC conversion in accordance with the duty ratios Da, Db can be applied to the DC power supplies 10a, 10b.

Back to FIG. 6, the electric current ILa flowing through the reactor L1 and the electric current ILb flowing through the reactor L2 are controlled by turning ON and OFF the switching elements S1 to S4 in accordance with the control signals SG1 to SG4. In the present embodiment, the electric current ILa corresponds to the electric current Ia of the DC power supply 10a and the electric current ILb corresponds to the electric current Ib of the DC power supply 10b.

As described above, in the PB mode, it is possible to control the output voltage VH to match with the voltage command value VH* by performing the DC-DC conversion in which the DC power is input and output in parallel between the DC power supplies 10a, 10b and the electric power line 20. Further, the input/output electric power of the DC power supply can be controlled in accordance with the electric current command value to the DC power supply which is under the electric current control.

In the PB mode, the shortage of the output electric power from the DC power supply under the electric current control in response to the input/output electric power request from the load 30 (hereinafter also referred to as "load request electric power PL") is output from the DC power supply under the voltage control. In this way, it becomes possible to indirectly control the electric power distribution ratio between the DC power supplies by using the setting of the electric current command value in the electric current control. As a result, in the PB mode, it is possible to control the electric power distribution between the DC power supplies 10a, 10b, among the total electric power PH (PH=Pa+Pb) which is input and output by the DC power supplies 10a, 10b as a whole to the electric power line 20. Further, with a setting of the electric current command value, it becomes also possible to charge one of the DC power supplies with output electric power from the other DC power supply. In the descriptions below, the output electric powers Pa, Pb, the total electric power PH, and the load request electric power PL are expressed in a manner that these electric power values are expressed in positive values while each of the DC power supplies 10a, 10b is discharged and the load 30 is in a motor driving operation, or in negative values while each of the DC power supplies 10a, 10b is charged and the load 30 is in a regenerative operation.

<Boosting Voltage Operation in PBD Mode>

Figure 8A:
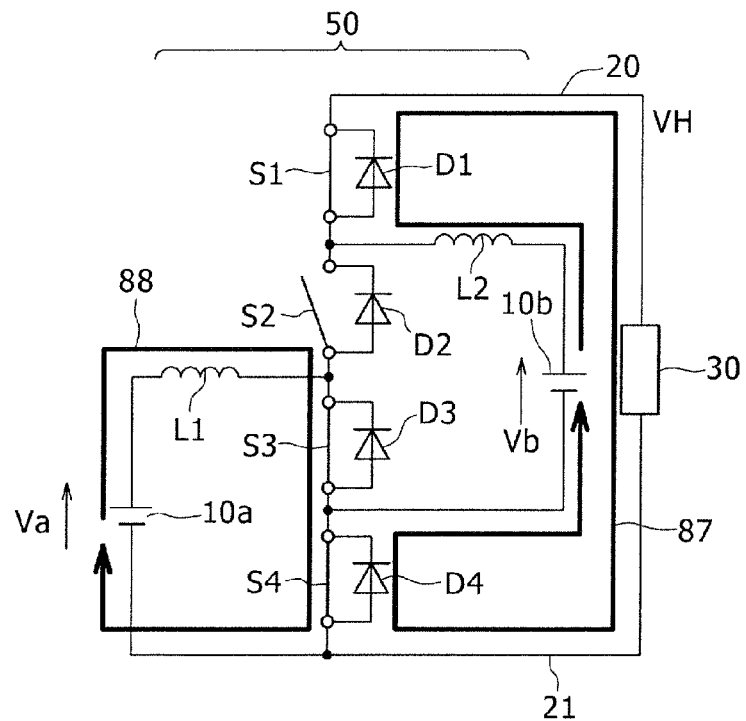
FIG. 8A is a circuit diagram showing a DC-DC conversion applied to the first DC power supply and a direct connection of the second DC power supply in a parallel boosting voltage direct (PBD) mode.
Figure 8B:
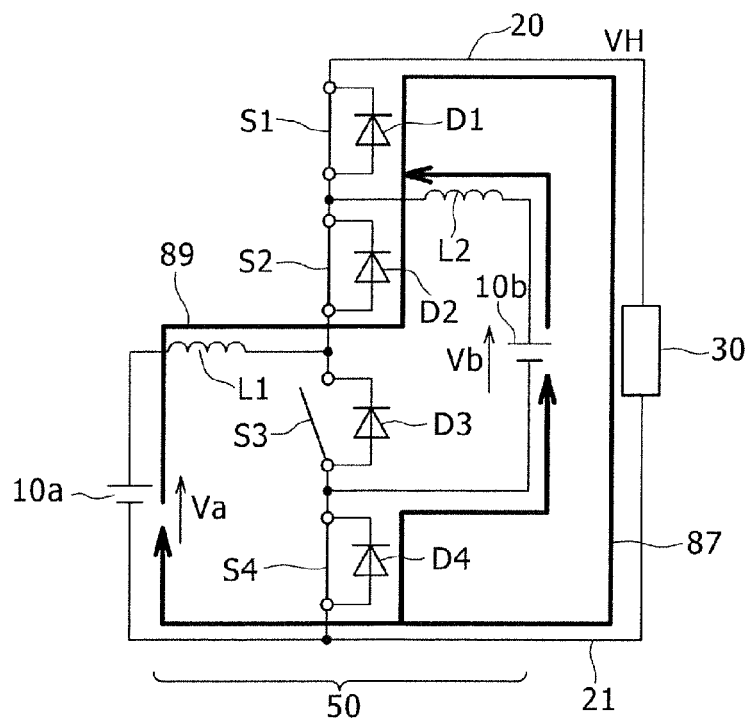
FIG. 8B is a circuit diagram showing a DC-DC conversion applied to the first DC power supply and a direct connection of the second DC power supply in the PBD mode.

Next, with reference to FIGS. 8A, 8B and 9, a boosting voltage operation in the PBD mode is described in detail below. FIGS. 8A and 8B show the DC-DC conversion (boosting voltage operation) applied to the DC power supply 10a in the PBD mode, and to the DC power supply 10b connected in parallel to the DC power supply 10a and directly to the electric power line 20.

In the PBD mode, as shown in FIGS. 8A and 8B, the switching elements S1 and S4 are fixed to ON state. In this way, the DC power supply 10b is directly connected to the electric power line 20. As a result, an electric current path 87 is formed such that electric current flows from and returns to the DC power supply 10b through the reactor L2, the diode D1 and the switching element S1, the electric power line 20, the load 30, the ground wire 21, and the diode D4 and the switching element S4.

In the electric current path 87, electric current flows through the diodes D1, D4. Thus, without fixing the switching elements S1 and S4 to ON, the DC power supply 10b is directly connected to the electric power line 20 to form the electric current path 87. Therefore, in consideration of the output operation of the DC power supply 10b alone, the ON/OFF of the switching elements S1 and S4 may be controlled as for the other switching elements S2, S3 during the boosting voltage operation of the DC power supply 10a described below. However, when the switching elements S1 and S4 are turned OFF, no electric current path through which the regenerated electric power from the load 30 is charged to the DC power supply 10b is formed. Therefore, in the present embodiment, the switching elements S1 and S4 are fixed to ON state so as to form a charging path of the regenerated electric power to the DC power supply 10b.

As described above, because the DC power supply 10b is directly connected to the electric power line 20 in the PBD mode, the voltage Vb of the DC power supply 10b is output to the electric power line 20 without the DC-DC conversion (DC voltage conversion). In this way, the output voltage VH of the electric power line 20 substantially matches the voltage Vb of the DC power supply 10b. Thus, the output voltage VH of the electric power line 20 cannot be controlled. Therefore, the PBD mode is applicable when the voltage command value VH* for the output voltage VH of the electric power line 20 which is determined in accordance with the requested electric power from the load 30 is equal to or less than the voltage Vb of the DC power supply 10b. It should be noted that the PBD mode may be performed with the voltage Va of the DC power supply 10a larger than the voltage Vb of the DC power supply 10b (Va>Vb) by directly connecting the DC power supply 10a to the electric power line 20 and applying the boosting voltage operation to the DC power supply 10b.

In contrast, between the DC power supply 10a and the electric power line 20, the boosting voltage operation almost identical to that of the PB mode described above with reference to FIGS. 4A to 6 is performed. As shown in FIG. 8A, an electric current path 88 through which energy is stored in the reactor L1 is formed by turning ON the switching element S3 and turning OFF the switching element S2. In this way, a chopper circuit with the lower arm elements turned ON is formed for the DC power supply 10a.

In contrast, as shown in FIG. 8B, an electric current path 89 through which the energy stored in the reactor L1 is output with the energy of the DC power supply 10a is formed by turning OFF the switching element S3 and turning ON the switching element S2. In this way, a chopper circuit with the upper arm elements turned ON is formed for the DC power supply 10a.

As described above, by alternatively repeating a first period in which the switching element S3 is turned ON while the switching element S2 is turned OFF, and a second period in which the switching element S2 is turned ON while the switching element S3 is turned OFF, a boost chopper circuit for the DC power supply 10a is formed.

In the DC-DC conversion shown in FIGS. 8A and 8B, the boosted voltage is controlled to be in a range which can be considered to be equal to the voltage Vb of the DC power supply 10b (that is, the output voltage VH of the electric power line 20). The "range which can be considered to be equal" means that the boosted voltage may be slightly higher or lower than the voltage Vb of the DC power supply 10b. By setting the boosted voltage of the DC power supply 10a slightly higher than the voltage Vb of the DC power supply 10b, the total electric current (Ia+Ib) flowing to the electric power line 20 increases, because the electric current Ib from the DC power supply 10b decreases, while the electric current Ia from the DC power supply 10a increases more than the decrease of the electric current from the DC power supply 10b. As a result, the total electric power PH supplied to the load 30 increases.

In contrast, by setting the boosted voltage of the DC power supply 10a slightly lower than the voltage Vb of the DC power supply 10b, the total electric current (Ia+Ib) flowing through the electric power line 20 decreases, because the electric current Ia from the DC power supply 10a decreases more than the increase of the electric current from the DC power supply 10b. As a result, the total electric power PH supplied to the load 30 decreases.

The boosted voltage of the DC power supply 10a in the PBD mode can be controlled by adjusting the duty ratio Da during which the switching element S3 forming the lower arm element of the boost chopper circuit is ON. In other words, by adjusting the duty ratio of the switching element S3, not only the electric power supplied to the electric power line 20 from the DC power supply 10a, but also the electric distribution ratio between the DC power supplies 10a, 10b can be controlled within a predetermined range. It should be noted here that, as in the PB mode, the relationship between the voltage Va of the DC power supply 10a and the output voltage VH of the electric power line 20 can be defined in the above equation (1) including the duty ratio Da.

Figures 9, 10:
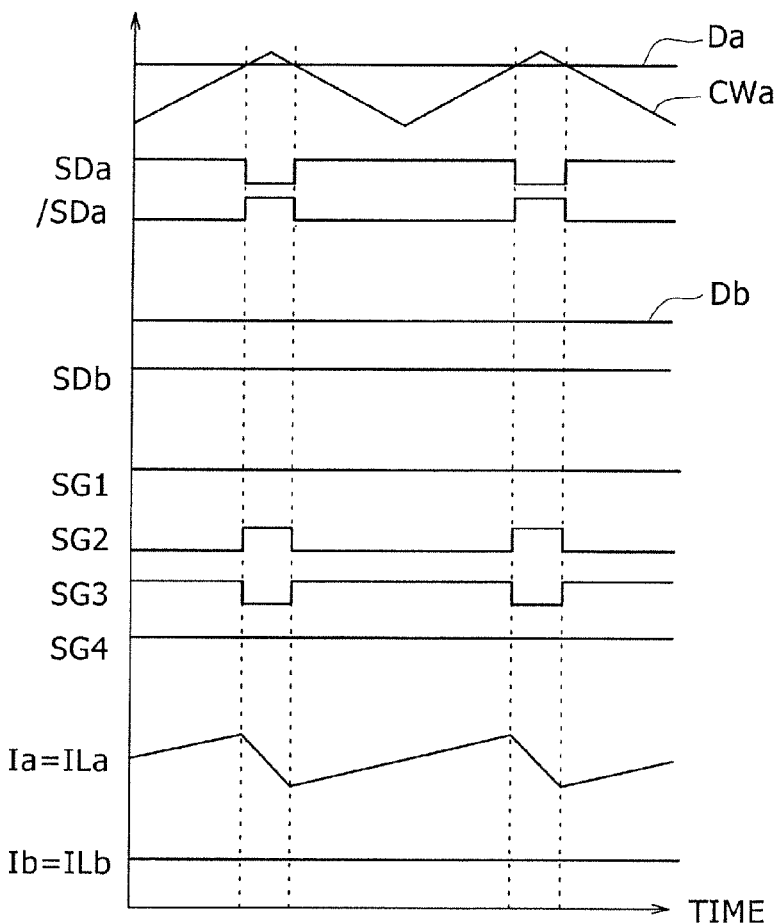
FIG. 9 is a waveform diagram showing an exemplary control operation of each switching element in the PBD mode.
FIG. 10 is a table showing logical expressions which are used to set a control operation of each switching element in the PBD mode.

FIG. 9 is a waveform diagram showing an exemplary control operation of the switching elements in the PBD mode. As shown in FIG. 9, in the PBD mode in the present embodiment, the output of the DC power supply 10b is used as the output voltage VH and the output of the DC power supply 10a is controlled (electric current control) to compensate the electric current deviation of the electric current Ia. The command value (Ia*) in the electric current control on this occasion can be set to control the output electric power of the DC power supply 10a. In such a case, the duty ratio Da is calculated based on the electric current deviation ΔIa(ΔIa=Ia*−Ia).

A control pulse signal SDa is generated based on a comparison between the duty ratio Da used to control the output of the DC power supply 10a and the carrier wave CWa. A control signal /SDa is an inversion signal of the control pulse signal SDa. However, as the switching elements S1 and S4 are maintained to be ON, the duty ratio Db of the switching elements S1 and S4 forming the upper arm elements is set to be constantly zero. As a result, as shown in FIG. 10, the control signals SG1 and SG4 are respectively fixed at the high level, forming a so-called "upper arm ON" state.

As is apparent from FIGS. 9 and 10, because the control signals SG2 and SG3 are in the inverse relationship each other in the PBD mode, the switching elements S2 and S3 are turned ON and OFF in an inverse manner with each other. Further, the control signals SG1 and SG4 are maintained to be ON. In this way, the DC conversion in accordance with the duty ratio Da can be performed on the DC power supply 10a.

In the PBD mode, the shortage of the output electric power from the DC power supply 10a under the electric current control in response to the load request electric power PL is output from the DC power supply 10b which is directly connected to the electric power line 20. In this way, it becomes possible to indirectly control the electric power distribution ratio between the DC power supplies 10a, 10b by using the setting of the electric current command value in the electric current control. As a result, in the PBD mode, it is possible to control the electric power distribution between the DC power supplies 10a, 10b, among the total electric power PH (PH=Pa+PB) which is input and output by the DC power supplies 10a, 10b as a whole to the electric power line 20. Further, with a setting of the electric current command value, it becomes also possible to charge one of the DC power supplies with output electric power from the other DC power supply.

<Operation Mode Selection Process>

Figures 11, 12:
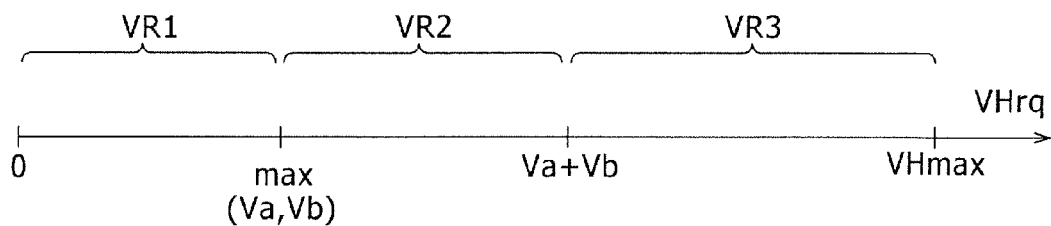
FIG. 11 is a table showing whether or not the electric power distribution ratio is controllable between the DC power supplies as well as settable ranges of output voltage in each operation mode shown in FIG. 3.
FIG. 12 is a conceptual diagram describing definitions of load request voltage ranges.

Next, selection processes of the operation modes in the electric power conversion control according to the present embodiment are described. FIG. 11 shows controllability of the electric power distribution ratio k between the DC power supplies 10a, 10b and settable ranges of the output voltage VH in each operation mode in FIG. 3.

As referring to FIG. 11, in the PB mode, the electric power distribution ratio k between the DC power supplies 10a, 10b can be controlled using the setting of the electric current command value to the DC power supply under the electric current control. The electric power distribution ratio k (k=Pa/PH) is defined by the ratio of the output electric power Pa of the DC power supply 10a to the total electric power PH (PH=Pa+Pb). Thus, in the PB mode, the electric power distribution ratio k can be set to any value in a range of 0 to 1.0. Further, in the PB mode, the output voltage VH can be controlled in a range from the max (Va, Vb) which is the maximum value of the voltages Va and Vb to the upper limit voltage VHmax which is the upper limit in controlling the output voltage VH. When Va>Vb, max (Va, Vb)=Va. When Vb>Va, max (Va, Vb)=Vb. The upper limit voltage VHmax is set in consideration of conditions such as breakdown voltage of components of the system 1.

The electric power distribution ratio k between the DC power supplies 10a, 10b can also be controlled in the PBD mode using the setting of the electric current command value Ia* to the DC power supply 10a under the electric current control. However, unlike the PB mode in which the duty ratio of each of the DC power supplies 10a, 10b can be independently controlled, the PBD mode is subject to a constrain that the boosted voltage of the DC power supply 10a should be substantially equal to the output voltage Vb of the DC power supply 10b to the electric power line 20. Therefore, the settable range of the electric power distribution ratio k is limited to a range narrower than the range in the PB mode. Further, in the PBD mode, the output voltage VH of the electric power line 20 is uniquely determined to be the voltage Vb of the DC power supply 10b which is directly connected to the electric power line 20.

Among the other operation modes, the electric power distribution ratio k is 1 or 0 in the aB mode, the bB mode, the aD mode, and the bD mode, all of which use only one of the DC power supplies. In the SB mode and SD mode, because the electric power distribution ratio k is uniquely determined by the ratio between the voltages Va and Vb of the DC power supplies 10a and 10b, the electric power distribution control cannot be performed. The electric power distribution control cannot be performed in the PD mode either, because the electric power distribution ratio k is uniquely determined by the ratio of internal resistances Ra, Rb of the DC power supplies 10a, 10b which are directly connected in parallel.

In the power supply system 1, the output voltage VH which is supplied to the load 30 is set in accordance with the operation state of the load 30 (such as the torque and rotational speed). As shown in FIG. 2 as an example, when the load 30 is the motor generator 35 which is mounted on the electrically-driven vehicle as a drive force source, the load request voltage VHrq of the motor generator 35 is set in accordance with the vehicle speed, the accelerator opening degree, or the like. The output voltage VH of the electric power line 20 which becomes the supply voltage to the load 30 needs to be set equal to or larger than the load request voltage VHrq. Therefore, the operation mode that can be applied by the electric power converter 50 depends on the range of the load request voltage VHrq which is set in accordance with the operation state of the load 30.

Figures 13, 14:
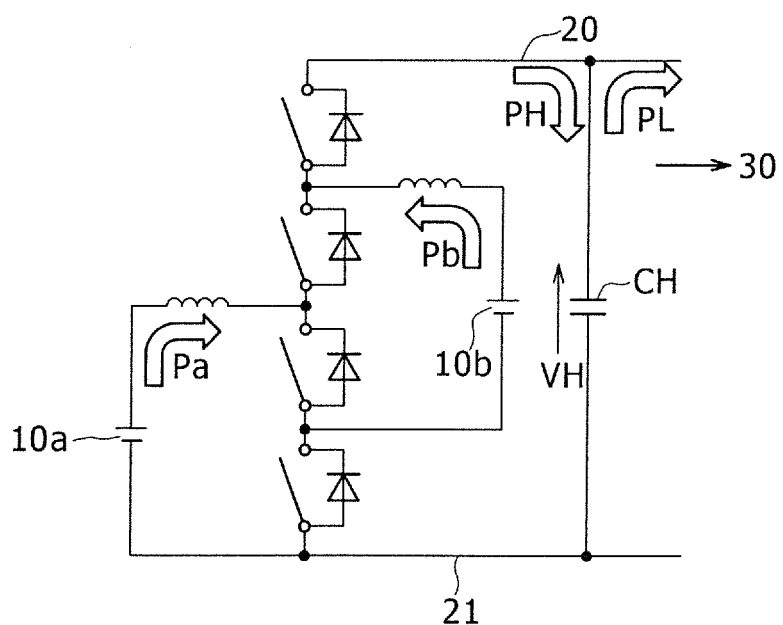
FIG. 13 is a table showing selectable operation modes in each voltage range shown in FIG. 12.
FIG. 14 is conceptual diagram describing basic concept of an electric power conversion control according to an embodiment of the present invention.

FIG. 12 shows the definitions of the voltage ranges VR1 to VR3 of the load request voltage VHrq. FIG. 13 shows the selectable operation modes in each of the voltage ranges VR1-VR3.

As referring to FIG. 12, the load request voltage VHrq is set in any one of voltage ranges VR1 (VHrq≤max (Va, Vb)), VR2 (max (Va, Vb)<VHrq≤Va+Vb), and VR3 (Va+Vb<VHrq≤VHmax).

Because the electric power converter 50 cannot output voltage lower than the max (Va, Vb), when the load request voltage VHrq is within the voltage range VR1, the output voltage VH cannot be set to be equal to the load request voltage VHrq. Therefore, as shown in FIG. 13, in the voltage range VR1, the aD mode, the bD mode, the PD mode, and the PBD mode are applicable, in order to provide the VH as close as possible to the VHrq in the range of VH≥VHrq.

In all the boosting voltage modes except for the PBD mode; namely, the aB mode, the bD mode, and the PB mode, the output voltage VH can be controlled in accordance with the voltage command value VH* when the output voltage VH is in the range from max (Va, Vb) to VHmax. In contrast, in the SB mode, the output voltage VH cannot be controlled to be lower than (Va+Vb). In other words, in the SB mode, the output voltage VH can be controlled in accordance with the voltage command value VH* if the output voltage VH is within the range from (Va+Vb) to VHmax.

In the voltage range VR2, the aB mode, the bB mode, and the PB mode are applicable in consideration of the controllable range of the output voltage VH in each operation mode described above. When one of these modes is applied, it becomes possible to match the output voltage VH with the load request voltage VHrq by setting VH*=VHrq. In contrast, the aD mode, the bD mode, the PD mode, and the PBD mode cannot be applied, due to shortage of voltage.

The SD mode is further applicable in the voltage range VR2, because the SD mode meets the condition of VH≥VHrq. In the SD mode, although it is impossible to match the output voltage VH (VH=Va+Vb) with the load request voltage VHrq, the loss of the electric power converter 50 can be significantly restricted, because no frequent switching is performed. In this way, the loss of the power supply system 1 as a whole may be more restricted than in the aB mode, the bB mode, and the PB mode. Therefore, the SD mode can be included in the selectable operation modes in the voltage range VR2. In contrast, the SB mode is excluded from the applicable modes in the voltage range VR2, because the difference between the output voltage VH and the load request voltage VHrq, and the loss at the electric power converter 50 may be larger than those in the SD mode.

In the voltage range VR3, the PB mode, the SB mode, the aB mode, and the bB mode are applicable, in consideration of the controllable range of the output voltage VH in each operation mode described above. When one of these modes is applied, it becomes possible to match the output voltage VH with the load request voltage VHrq by setting VH*=VHrq. In contrast, the direct connection modes (the aD mode, the bD mode, the PD mode and the SD mode) and the PBD mode cannot be applied, due to shortage of voltage.

As referring to FIG. 13, each voltage range VR1, VR2, VR3 includes a plurality of operation modes. The controller 40 selects and applies one of the operation modes. The controller 40 may select one of the operation modes to minimize the loss in the power supply system 1 as a whole in accordance with the load request voltage VHrq which is requested based on the operation state of the load 30 and the power supply state of the DC power supplies 10a, 10b (such as the SOC and charge/discharge limitations). The power supply state includes, for example, the voltages Va, Vb, the electric currents Ia, Ib, and temperatures Ta, Tb. The output electric power Pa, Pb of the DC power supplies 10a, 10b can be obtained from the total electric power PH and the electric power distribution ratio k. The controller 40 may select one of the operation modes from the plurality of applicable operation modes by obtaining the sum of the converter loss, the power supply loss, the load loss, and other losses as the loss of the power supply system 1 as a whole, and comparing the obtained values between the modes.

<Electric Power Converter Control by Controller>

FIG. 14 describes a basic concept of the electric power converter control in the power supply system according to the present embodiment. As referring to FIG. 14, the output voltage VH is boosted when the total electric power PH is larger than the load request electric power PL (PH>PL), while the output voltage VH is lowered with PH<PL. Therefore, in the electric power converter control according to the present embodiment, the command value of the total electric power PH is set in accordance with the voltage deviation ΔVH between the output voltage VH and the voltage command value VH*. Further, the output of each of the DC power supplies 10a, 10b is controlled by electric power (electric current control) by distributing the total electric power PH to the output electric powers Pa and Pb.

Figure 15:
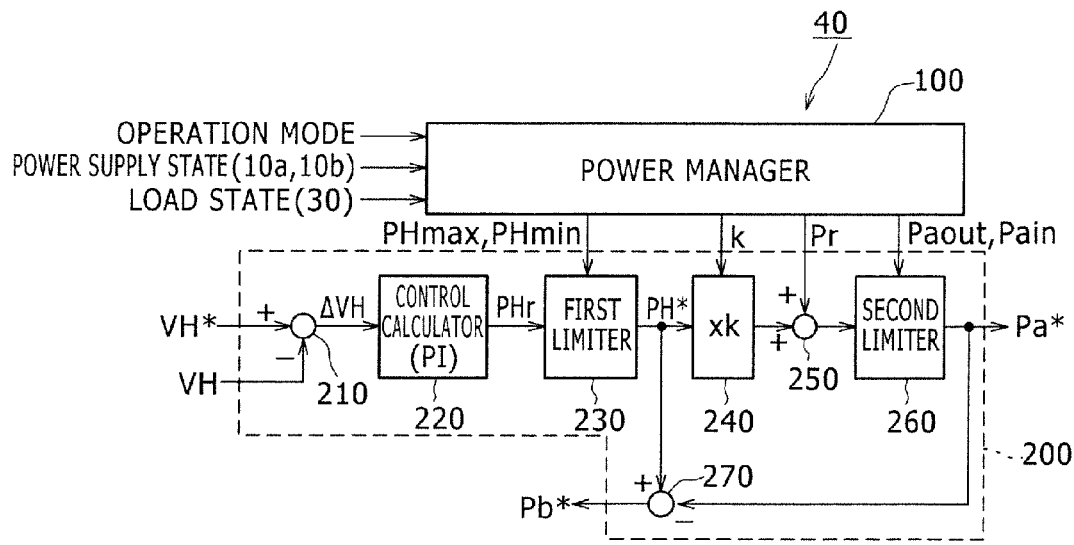
FIG. 15 is a block diagram prepared to describe an electric power conversion control according to an embodiment of the present invention.
Figure 16:
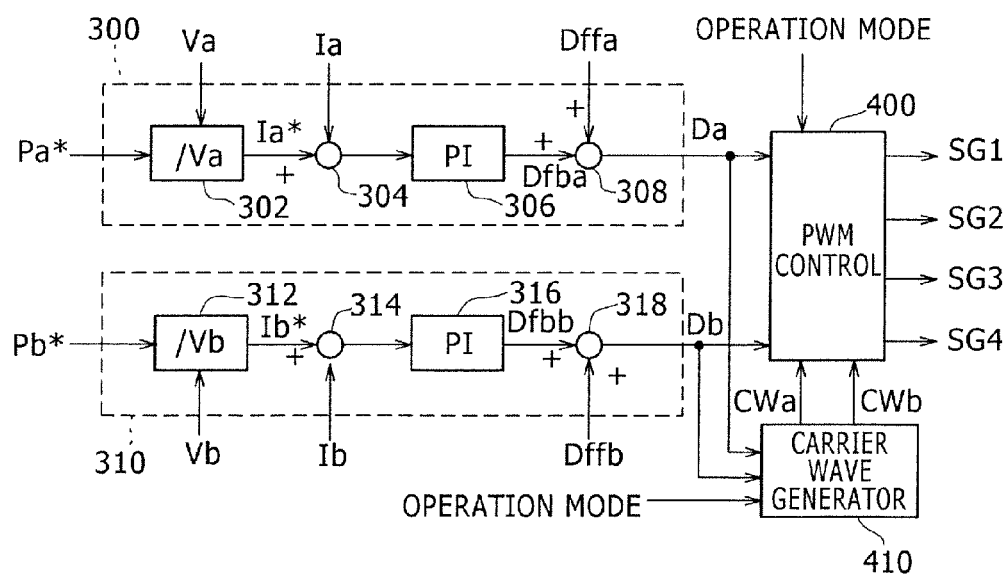
FIG. 16 is another block diagram prepared to describe an electric power conversion control according to an embodiment of the present invention.

FIGS. 15 and 16 are block diagrams for describing the electric power converter control according to the present embodiment. FIG. 15 shows the configuration for control operation to set an electric power command value to each of the DC power supplies. FIG. 16 shows a configuration of control calculation to control the output of each of the DC power supplies in accordance with the electric power command value which has been set by the configuration shown in FIG. 15. The control configuration of the PB mode is described first below, and the control operation of the PBD mode further below.

As referring to FIG. 15, the controller 40 includes a power manager 100 and an electric power controller 200.

In accordance with the operation states of the DC power supplies 10a, 10b and/or the load 30, the power manager 100 sets the electric power upper limit PHmax and the electric power lower limit PHmin for the total electric power PH, the dischargeable limit Paout and the chargeable limit Pain of the DC power supply 10a, the dischargeable limit Pbout and the chargeable limit Pbin of the DC power supply 10b, and the electric power distribution ratio k between the DC power supplies 10a, 10b. The electric power upper limit PHmax of the total electric power PH can be set to the sum of the dischargeable limits Paout, Pbout of the DC power supplies 10a, 10b (PHmax=Paout+Pbout). Further, the electric power lower limit Pmin of the total electric power PH can be set to the sum of the chargeable limits Pain, Pbin of the DC power supplies 10a, 10b (PHmin=Pain+Pbin).

The power manager 100 can set the electric power distribution ratio k. As described above, in the PB mode, the electric power distribution ratio k can be set to any value as 0≤k≤1.0, while, in the PBD mode, the electric power distribution ratio k is set in a narrower range than in the PB mode.

The power manager 100 can also set a circulating electric power value Pr for charging and discharging between the DC power supplies 10a, 10b. The circulating electric power value Pr represents the output electric power from the DC power supply 10a to charge the DC power supply 10b, or the output electric power from the DC power supply 10b to charge the DC power supply 10a. For example, when Pr>0 with k=1 in a motor driving operation, the DC power supply 10a can output the electric power to supply the total electric power PH to the electric power line 20 while charging the DC power supply 10b. In contrast, when Pr<0 with k=0, the DC power supply 10b can output the electric power to supply the total electric power PH to the electric power line 20 while charging the DC power supply 10a.

The electric power controller 200 sets the electric power command values Pa*, Pb* for the DC power supplies 10a, 10b in accordance with the voltage deviation of the output voltage VH. The electric power controller 200 includes a deviation calculator 210, a control calculator 220, a first limiter 230, an electric power distributer 240, a circulating electric power adder 250, a second limiter 260, and a subtractor 270.

The deviation calculator 210 calculates the voltage deviation ΔVH(ΔVH=VH*−VH) which represents a difference between the voltage command value VH* and the sensed output voltage VH. The control calculator 220 calculates, based on the voltage deviation ΔVH, the total electric power PHr requested to perform the voltage control. For example, the control calculator 220 sets the PHr based on the following Equation (3) using proportional-integral (PI) calculation:

$$PHr = Kp \times \Delta VH + \Sigma(Ki \times \Delta VH) \qquad (3)$$

wherein Kp represents a proportional control gain and Ki represents an integral control gain. The capacity value of a smoothing capacitor CH is reflected in these control gains. By setting the total electric power PHr based on the Equation (3), a feedback control to reduce the voltage deviation ΔVH can be achieved.

The first limiter 230 limits the total electric power command value PH* to be within a range from PHmin to PHmax which is set by the power manager 100. When PHr>PHmax, the first limiter 230 sets PH*=PHmax. Similarly, when PHr<PHmin, the first limiter 230 sets PH*=PHmin. When PHmax≥PHr≥PHmin, PH*=PHr. The total electric power command value PH* is set accordingly.

The electric power distributer 240 calculates the output electric power k×PH* to be output from the DC power supply 10a based on the total electric power command PH* and the electric power distribution ratio k. The circulating electric power adder 250 calculates the electric power Par required from the DC power supply 10a by adding k×PH* calculated by the electric power distributer 240 and the circulating electric power value Pr set by the power manager 100 (Par=k×PH*+Pr).

The second limiter 260 limits the electric power command value Pa* for the DC power supply 10a such that the electric power command value Pa* is within a range from Paout to Pain set by the power manager 100. When Par>Paout, the second limiter 260 applies a modification to set Pa*=Paout. Similarly, when Par<Pain, the second limiter 260 applies a modification to set Pa*=Pain. When Paout≥Par≥Pain, Pa*=Par without a modification. The electric power command value Pa* for the DC power supply 10a is set accordingly.

The subtractor 270 sets the electric power command value Pb* to the DC power supply 10b by subtracting the electric power command value Pa* from the total electric power command value PH* (Pb*=PH*−Pa*).

As shown in FIG. 16, the controller 40 includes electric current controlling units 300, 310, a PWM controlling unit 400, and a carrier wave generator 410 in order to control the output from the DC power supplies 10a, 10b in accordance with the electric power command values Pa*, Pb*. The electric current controlling unit 300 controls the output of the DC power supply 10a by electric current. Similarly, the electric current controlling unit 310 controls the output of the DC power supply 10b by electric current.

The electric current controlling unit 300 includes an electric current command generator 302, a deviation calculator 304, a control calculator 306, and a feedforward (FF) adder 308.

The electric current command generator 302 sets an electric current command value Ia* to the DC power supply 10a in accordance with the electric power command value Pa* and a sensed value of the voltage Va (Ia*=Pa*/Va). The deviation calculator 304 calculates the electric current deviation ΔIa (ΔIa=Ia*−Ia) which is a difference between the electric current command value Ia* and the sensed electric current Ia. The control calculator 306 calculates the control amount Dfba of the electric current feedback control in accordance with the electric current deviation ΔIa. For example, the control calculator 306 sets the Dfba based on the following Equation (4) using proportional-integral (PI) calculation:

$$Dfba = Kp \times \Delta Ia + \Sigma(Ki \times \Delta Ia) \qquad (4)$$

wherein Kp represents a proportional control gain and Ki represents an integral control gain. These control gains are set separately from the above Equation (3).

The FF control amount Dffa of the voltage feedforward control is set by using Equation (5) based on the equation Da=(VH−Va)/VH which is obtained by solving the Equation (1) for Da.

$$Dffa = (VH^* - Va)/VH^* \qquad (5)$$

The FF adder 308 calculates a duty ratio Da regarding the output control of the DC power supply 10a by adding the FB control amount Dfba and the FF control amount Dffa. As in Equation (1), the duty ratio Da represents the duty ratio of the period in which the lower arm elements (switching elements S3, S4) of the boost chopper circuit (FIG. 4A) are turned ON when the DC-DC conversion is performed between the voltage Va of the DC power supply 10a and the output voltage VH.

The electric current controlling unit 310 includes an electric current command generator 312, a deviation calculator 314, a control calculator 316, and an FF adder 318.

The electric current command generator 312 sets an electric current command value Ib* to the DC power supply 10b in accordance with the electric power command value Pb* and a sensed value of the voltage Vb (Ib*=Pb*/Vb). The deviation calculator 314 calculates the electric current deviation ΔIb (ΔIb=Ib*−Ib) which is a difference between the electric current command value Ib* and the sensed value of the electric current Ib. The control calculator 316 calculates the control amount Dfbb of the electric current feedback control in accordance with the electric current deviation ΔIb. For example, the control calculator 316 calculates the Dfbb based on the following Equation (6) using proportional-integral (PI) calculation:

$$Dfbb = Kp \times \Delta Ib + \Sigma(Ki \times \Delta Ib) \qquad (6)$$

wherein Kp represents a proportional control gain and Ki represents an integral control gain. These control gains are set separately from the above Equations (3) and (4).

The FF control amount Dffb of the voltage feedforward control is set by using Equation (7) based on the equation Db=(VH−Vb)/VH which is obtained by solving Equation (2) for Db.

$$Dffb = (VH^* - Vb)/VH^* \qquad (7)$$

The FF adder 318 calculates a duty ratio Db regarding the output control of the DC power supply 10b by adding the FB control amount Dfbb and the FF control amount Dffb. As in Equation (2), the duty ratio Db represents the duty ratio of the period in which the lower arm elements (switching elements S2, S3) of the boost chopper circuit (FIG. 5A) are turned ON when the DC-DC conversion is performed between the voltage Vb of the DC power supply 10b and the output voltage VH.

The PWM controlling unit 400 generates the control signals SG1 to SG4 of the switching elements S1 to S4 by pulse width modulation (PWM) control based on the duty ratios Da, Db set by the electric current controlling units 300, 310 and the carrier waves CWa, CWb from the carrier wave generator 410. As the pulse width control and the generation of the control signals SG1 to SG4 by the PWM controlling unit 400 are performed in the same manner as described in FIGS. 6 and 7, a detailed description is omitted.

As described above, according to the electric power conversion control according to the present embodiment, in the DC-DC conversion in the PB mode, the output voltage VH can be controlled to be equal to the voltage command value VH* by converting the voltage deviation of the output voltage VH to the electric power command value and controlling the output from each of the DC power supplies 10a, 10b by electric current. In this way, it becomes possible to reliably prevent each of the DC power supplies 10a, 10b from being overpowered or underpowered (specifically, overcharged or overdischarged) based on the output electric power. Further, it becomes possible to easily control the electric power distribution ratio k between the DC power supplies 10a, 10b, and the circulating electric power Pr.

In particular, in the PB mode, the electric current command value can be directly limited for one of the DC power supplies 10a, 10b. In the configuration shown in FIG. 15, the electric power command value Pa* to the DC power supply 10a can be reliably controlled by the second limiter 260 to be in the range of Pain≤Pa*≤Paout. In this way, it becomes possible to strictly prevent the DC power supply 10a from being overpowered or underpowered.

Next, the electric power control in the PBD mode is described. Like in the PB mode, the electric power command value PH* is generated in the PBD mode by using the deviation calculator 210, the control calculator 220, and the first limiter 230 based on the voltage command value VH* and the output voltage VH.

However, because the DC power supply 10b is directly connected to the electric power line 20 in the PBD mode, it is impossible to distribute the electric power command value PH* by an arbitrary electric power distribution ratio k (0≤k≤1). Specifically, because it is possible to control the output voltage VH of the electric power line 20 only in the range which can be recognized as substantially equal to the voltage Vb of the DC power supply 10b, the output electric power Pb supplied from the DC power supply 10b becomes substantially constant at Pb (that is, Pb*)=Ib×Vb accordingly.

Therefore, when the PBD mode is applied, the power manager 100 of the controller 40 provides the electric power distribution ratio k to the electric power distributer 240 such that the electric power value obtained by subtracting the electric power command value Pb* outputtable from the DC power supply 10b from the electric power command value PH* is used as the electric power command value Pa* to the DC power supply 10a, unlike an arbitrary electric power distribution ratio k in the PB mode. Due to such a restriction, the electric power distribution ratio k in the PBD mode is limited to a narrower range than that in the PB mode, as described above.

The PBD mode has the following same characteristics as the PB mode: the electric command value PH* is limited by the first limiter 230 as PHmin≤electric power command value PH*≤PHmax; the circulating electric power value Pr is added to the electric power command value PH* by the circulating electric power adder 250; and the electric power command value Pa* is limited as Pain≤Pa*≤Paout.

The electric power command values Pa*, Pb* for the DC power supplies 10a, 10b generated as described above are provided to the controlling unit configured as shown in FIG. 16.

The electric current controlling unit 300 performs electric current feedback control like in the PB mode to output the output electric power Pa from the DC power supply 10a in accordance with the electric power command value Pa*. However, in the DC power supply 10b, the switching elements S1 and S4 of the electric power converter 50 are fixed to ON and maintained to be directly connected to the electric power line 20. Therefore, the operation of the electric current controlling unit 310 shown in FIG. 16 is stopped and the DC-DC conversion of the DC power supply 10b is not performed.

As described above, in the electric current conversion control according to the present embodiment, regarding the control operation of the electric power converter 50 shown in FIG. 1, the control configurations shown in FIGS. 15 and 16 can be commonly used in the operation modes which belong to the boosting modes in which the output voltage VH is controlled to the voltage command value VH*. In this way, it becomes possible to reduce the control calculation load in the control by the electric power converter 50 in which an operation mode is selected from a plurality of operation modes. Further, because switching of the operation modes can be smoothly performed, control performance can be enhanced.

<Electric Power Deviation Compensation Control>

Next, the electric power deviation compensation control in the PB mode and the PBD mode is described by referring to FIGS. 17 to 21.

As described above, when the power supply system 1 is in the PB mode or the PBD mode, the power supply system 1 is controlled such that, after distributing the total electric power PH equal to the requested electric power PL from the load 30 to the two DC power supplies 10a, 10b in accordance with the electric power distribution ratio k, the electric powers Pa, Pb are output respectively from the DC power supplies 10a, 10b. In the description below, there is assumed as an example such that, in the power supply system 1 according to the present embodiment, the DC power supply 10a serves as a power supply of the electric power controlled side, while the DC power supply 10b serves as a power supply of the voltage controlled side. However, the present invention is not limited to this example. As a matter of course, the DC power supply 10a may be used as a power supply of the voltage controlled side and the DC power supply 10b may be used as a power supply of the electric power controlled side.

In the power supply system 1, the electric power actually supplied to the load 30 from the DC power supply 10a may deviate from the electric power command value Pa* to the DC power supply 10a which is set based on the electric power distribution ratio k. Such a deviation may be caused by an offset error of a sensor for sensing the electric current Ia or the voltage Va of the DC power supply 10a. For example, when assuming that the load request electric power PL is 100 and the sensor offset error is −20, although the actual electric power of only 80 is substantially supplied from the DC power supply 10a to the load 30, because the offset error is undetectable under the control based on the values Va and Ia detected by the sensors, it may appear as if the electric power of 100 is supplied to the load 30 from the DC power supply 10a.

Because such a deviation of the electric power (in other words, a difference between the electric power command value Pa* and the actual output electric power Pa_act) caused by an offset of the values sensed by sensors is not detected as an electric power deviation under the control, the deviation cannot be eliminated by the feedback control by the electric current controlling unit 300 shown in FIG. 16. Further, when the electric power Pa supplied to the load 30 from the DC power supply 10a is not sufficient for the electric power distribution ratio k due to the above-described electric power deviation, the shortage may be compensated by the electric power output from the DC power supply 10b. In such a case, the electric power distribution from the DC power supply 10b becomes larger than the target electric power distribution ratio k. As a result, the DC power supply 10b may be continuously underpowered (overdischarged).

Although not shown in FIG. 1, an electric power supply line to an auxiliary device (such as a lamp, audio device, and air conditioner) may be connected to the electric power line between the DC power supply 10a and the reactor L1 of the electric power converter 50. In such a case, in the controller 40, the electric power command value Pa* is typically generated by adding the electric power requested by the auxiliary device to the share of the load request electric power PL to the DC power supply 10a. However, when the request electric power from the auxiliary device changes and such a change is not accurately reflected to the electric power command value Pa*, the above-described deviation may be increased.

Therefore, in the power supply system 1 according to the present embodiment, by performing the electric power deviation compensation control described below, the electric power distribution between the DC power supplies 10a, 10b can be correctly modified so as to eliminate the electric power deviation caused by the sensor characteristics or the like on the electric power controlled side. In this way, it becomes possible to prevent the DC power supply 10b on the voltage controlled side from being continuously overpowered or underpowered.

Figure 17:
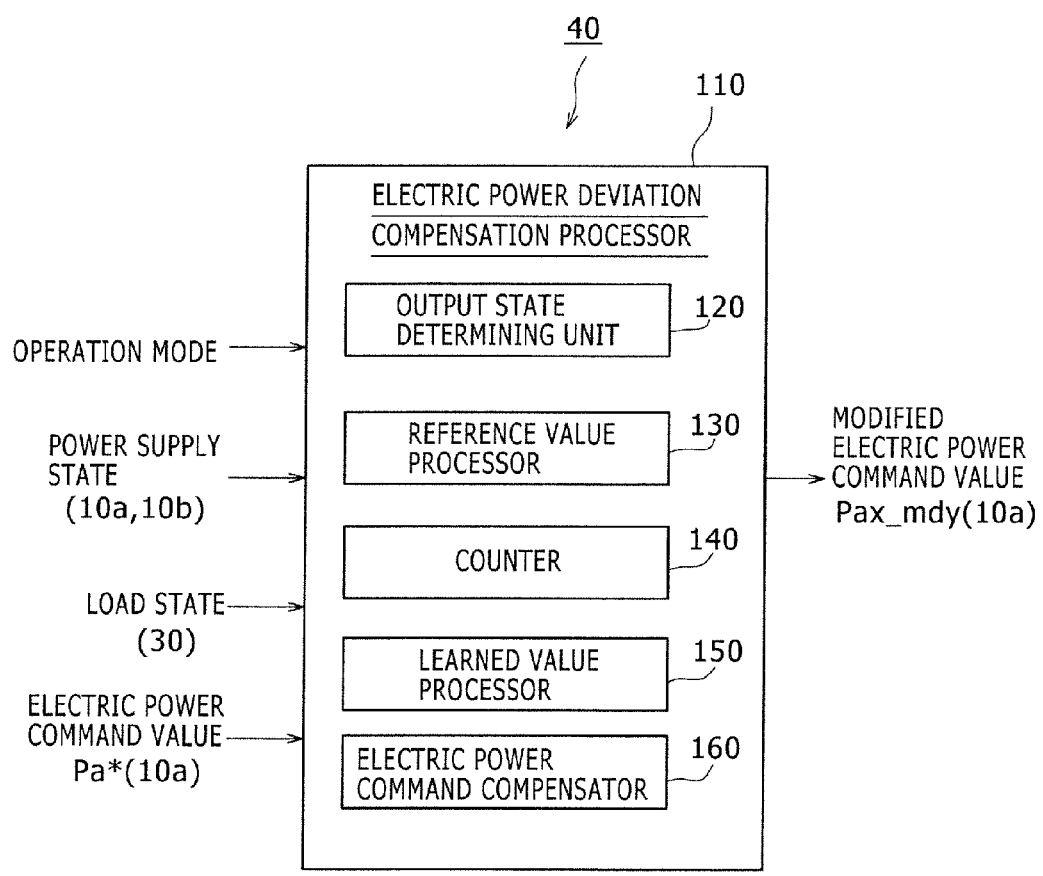
FIG. 17 is a functional block diagram of an electric power deviation compensation processor in a controller.

FIG. 17 is a functional block diagram of an electric power deviation compensation processor 110 included in the controller 40 in the power supply system 1 according to the present embodiment. The electric power deviation compensation processor 110 includes an output state determining unit 120, a reference value processor 130, a counter 140, a learned value processor 150, and an electric power command compensator 160.

The output state determining unit 120 determines whether or not the output state of the DC power supply 10a is stable. By performing the electric power deviation compensation control when the output state of the DC power supply 10a is stable, accurate compensation can be achieved with an appropriate compensation value. Specifically, the output state determining unit 120 may determine that the output state is stable when the time change ratio of the electric power command value Pa* to the DC power supply 10a is equal to or less than a predetermined value A.

To determine that the output state is stable, the output state determining unit 120 may apply an additional requirement that the electric power command value Pa* to the DC power supply 10a is equal to or larger than a predetermined value B. Such an additional requirement may be useful because, as described further below, the electric command value Pa* is compensated using a reference value which is obtained by dividing the electric power deviation of the DC power supply 10b (in other words, the difference between the actual output electric power Pb_act and the electric power command value Pb*) by the electric power command value Pa* to the DC power supply 10a; if the electric power command value Pa* (the denominator) is small, the compensation value becomes too large, resulting in excessive compensation.

Further, the output state determining unit 120 may apply another additional requirement that the electric power command value Pb* of the DC power supply 10b is equal to or larger than a predetermined value C. Such an additional requirement may be useful, because when the output electric value Pb of the DC power supply 10b is small, the electric power deviation of the DC power supply 10b becomes small accordingly, resulting in an unsuitable state for an accurate compensation.

The requirements used by the output state determining unit 120 to determine that the output state is stable are not limited to the above-described requirements. For example, the following requirements can be applied additionally or alternatively: the time change ratio of the total electric power PH (or the load request electric power PL) is equal to or less than a predetermined value, the fluctuation rate of the rotational speed of the motor generator is equal to or less than a predetermined value, the engine is not in a startup or shutdown operation, and the regenerative operation is not activated.

The reference value processor 130 calculates a reference value Kpa and a smoothed reference value Kpa_sm, both of which are used to compensate an electric power deviation. Specifically, the reference value processor 130 calculates the reference value Kpa in accordance with the following Equations (8) and (9):

$$\Delta Pb=Pb\_act-Pb^* \quad (8)$$

$$Kpa=\Delta Pb/Pa^* \quad (9)$$

where ΔPb represents an electric power deviation (difference) between the actual output electric power Pb_act of the DC power supply 10b and the electric power command value Pb*.

The reference value processor 130 applies a smoothing process to the reference value Kpa calculated in the above manner to obtain the smoothed reference value Kpa_sm. Specifically, the smoothing process can be performed by filtering, multiplying a time constant by, or averaging the calculated reference value Kpa.

The counter 140 counts the times of calculation of the reference value Kpa and the obtaining of the smoothed reference value Kpa_sm while the output state of the DC power supply 10b is stable so as to determine whether they are continuously obtained for a predetermined number of times. Specifically, the counter 140 increments a counted value c (initial value: 0) every time a process is performed by the reference value processor 130. The determination of the output state and the processing of the reference value are repeatedly performed until the counted value c reaches a predetermined number n.

The learned value processor 150 calculates a learned value Kpa_g by using the smoothed reference value Kpa_sm which has been obtained by the reference value processor 130, and updates the learned value Kpa_g by using an update amount ΔKpa which is obtained from the calculated learned value Kpa_g.

More specifically, the learned value processor 150 updates the learned value Kpa_g in accordance with the following Equations (10) and (11):

$$Kpa\_g=Kpa\_gpast+\Delta Kpa \quad (10)$$

$$\Delta Kpa=|Kpa\_sm-Kpa\_gpast|\times gain \quad (11)$$

wherein the Kpa_gpast (initial value: 1) represents the previous learned value which was obtained in the previous process.

According to the above Equations (10) and (11), the present learned value Kpa_g is calculated by adding the update amount ΔKpa (=|Kpa_sm−Kpa_gpast|×gain) to the previous learned value Kpa_gpast. The update amount ΔKpa is calculated by multiplying a gain by the difference (absolute value) between the smoothed learned value Kpa_sm which is obtained in the current process and the previously learned value Kpa_gpast. The difference between Kpa_and Kpa_gpast is multiplied by the gain so as to moderate the compensation of the learned value Kpa_g by applying the smoothing process to the update amount ΔKpa. However, the smoothing process of the update amount ΔKpa is not limited to the multiplication of the gain. Other methods can be applied.

It is preferable to set an upper limit value and a lower limit value to the learned value Kpa_g obtained as described above such that the electric power command value compensation process is performed when the learned value obtained in the current process (the learned value after update) is within the range defined by the upper and lower limit values, while the electric power command value compensation process is not performed when out of the range. In this way, it becomes possible to restrict a rapid change in the electric power command value Pa* after compensation, thereby improving the drivability of the vehicle mounted with the power supply system 1.

The learned value Kpa_g calculated in accordance with the Equation (10) is stored in a storage unit (not shown) provided with the controller 40. The learned value Kpa_g is arranged to be maintained in the storage after the operation of the power supply system 1 is stopped. Therefore, it is possible to operate with the already-modified electric power deviation due to sensor characteristics or the like when the power supply system 1 is operated next time.

The electric power command compensator 160 compensates the electric power command value Pa* to the DC power supply 10a by using the learned value Kpa_g which is obtained by the learned value processor 150. Specifically, the electric power command compensator 160 generates the modified electric power command value Pa*_mdy by multiplying the current electric power command value Pa* by the learned value Kpa_g, and then outputs the generated value.

Figure 18:
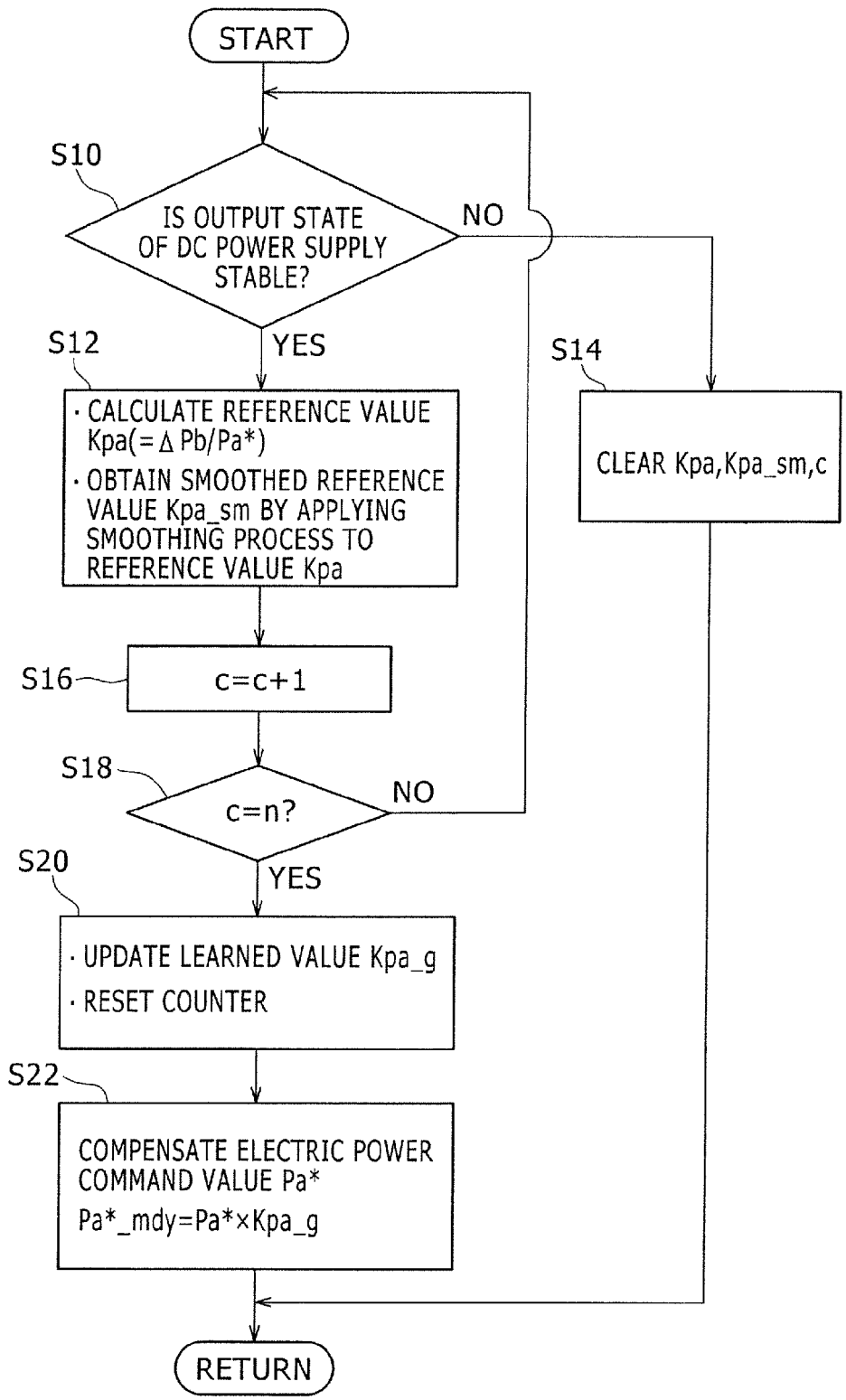
FIG. 18 is a flowchart showing processes of an electric power deviation compensation control performed by the controller.

FIG. 18 is a flowchart showing processes of electric power deviation compensation control performed by the above-described electric power deviation compensation processor 110. This process is performed by being read out from the storage unit at a predetermined time interval in the PB mode or the PBD mode in which the power supply system 1 is capable of electric power distribution control between the DC power supplies 10a, 10b in accordance with the electric power distribution ratio k.

As referring to FIG. 18, first, in step S10 the controller 40 determines whether or not the output state of the DC power supplies 10a, 10b is stable. This determination is performed by the output state determining unit 120. When it is determined that the "output state is stable" based on the time change ratio of the output electric power Pa of the DC power supply 10a or the like, the controller 40 proceeds next to step S12. When it is determined that the "output state is not stable," the controller 40 proceeds to step S14 to finish the electric power deviation compensation control after clearing the values of the reference value Kpa and the smoothed reference value Kpa_sm obtained by the reference value processor 130, and the counted value c.

When the output state of the DC power supplies 10a, 10b is stable, in the next step S12, the controller 40 calculates the reference value Kpa and further obtains the smoothed reference value Kpa_sm by applying the smoothing process to the calculated reference value Kpa. These processes are performed by the reference value processor 130.

Next, the controller 40 increments the counted value c in step S16. In the next step S18, the controller 40 determines whether or not the counted value c reaches a predetermined number n. When the counted value c is less than the predetermined number n, the controller 40 repeats the above-described steps S10 to S18.

When the counted value c=n after the repeated processes of the steps S10 to S18 as described above (in other words, when a predetermined time period has elapsed after the electric power deviation compensation control was started with the continuous stable output state of the DC power supplies 10a, 10b), the controller 40 updates the learned value Kpa_g in the next step S20. This process is performed by the above-described learned value processor 150. Further, in step S20, the counted value c is reset to 0 (counter value c=0). This process is performed by the above-described counter 140.

In the next step S22, the controller 40 compensates the electric power command value Pa* by multiplying the electric power command value Pa* to the DC power supply 10a by the updated learned value Kpa_g. In this way, a modified electric power command value Pa*_mdy which is modified in this compensation is output from the electric power deviation compensation processor 110 to the electric current controlling unit 300 (refer to FIG. 16) of the controller 40 so as to be used for the electric current control (electric power control) of the DC power supply 10a.

Figure 19:
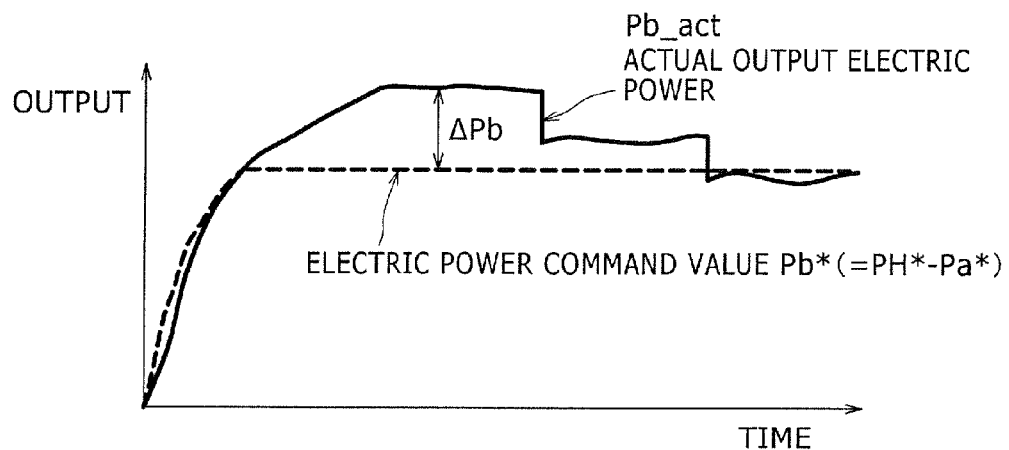
FIG. 19 is a graph showing transition of actual output electric power of the DC power supply on the voltage controlled side in the electric power deviation compensation control in FIG. 18.
Figure 20:
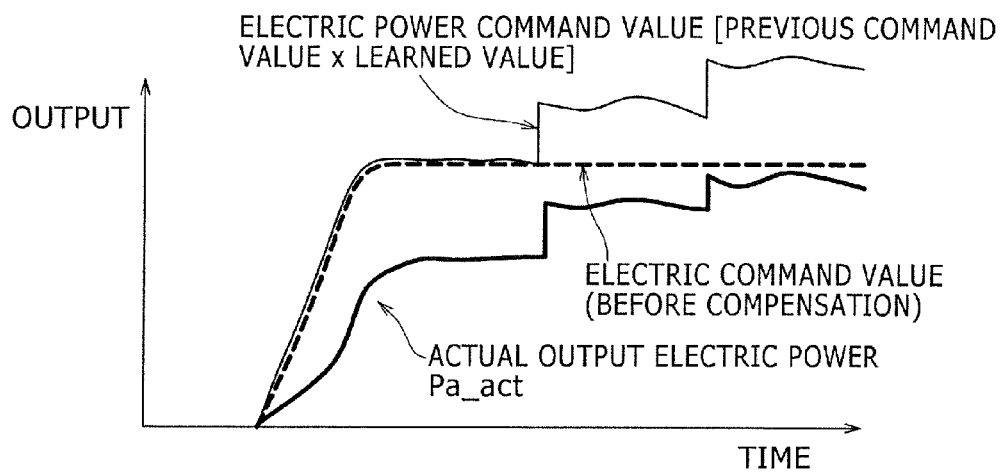
FIG. 20 is a graph showing transition of electric power command value and actual output electric power of the DC power supply on the electric power controlled side in the electric power deviation compensation control in FIG. 18.

FIG. 19 is a graph showing how the actual output electric power of the DC power supply 10b is modified in the electric power deviation compensation control described above by referring to FIG. 18. FIG. 20 is a graph showing how the electric power command value to the DC power supply 10a and the actual output electric power of the DC power supply 10a change in the above-described electric power deviation compensation control.

FIG. 19 shows the electric power command value Pb* to the DC power supply 10b in a broken line and the actual output electric power Pb from the DC power supply 10b in a solid line. In this example, the electric power command value Pb* increases with an elapse of time and becomes constant by being limited by the dischargeable limit value Pbout or other limitations. In contrast, the actual output electric power Pb_act increases with a slight response delay to the electric power command value PB*, and continues to increase after the electric power command value Pb* becomes constant.

The reason why the actual output electric power Pb_act of the DC power supply 10b increases higher than the electric power command value Pb* can be assumed that as the actual output electric power Pa_act of the DC power supply 10a shown in FIG. 20 is short with respect to the electric power command value Pa*, the shorted electric power is obtained from the DC power supply 10b. Specifically, the difference ΔPb between the actual output electric power Pb_act of the DC power supply 10b and the electric power command value Pb* is assumed as the shorted electric power of the DC power supply 10a.

It should be noted here that because the actual output electric power calculated from the detected values by the sensors which sense the voltage and the electric current on the DC power supply 10a side is a value which is offset by the sensor characteristics, the actual output electric power Pb_act may not match the electric power command value Pa* even by performing feedback control.

As described above, the electric power deviation compensation control is performed with an electric deviation occurring between the actual output electric power and the electric power command value for both of the DC power supplies 10a, 10b when the output state of the DC power supplies 10a, 10b is stable. In this way, as shown in FIG. 20, the electric power command value Pa* of the DC power supply 10a is compensated with the learned value Kpa_g such that the electric power command value Pa* of the DC power supply 10a is compensated by using the learned value Kpa_g to be increased in a stepwise manner from the electric command value Pa* before the compensation shown in a broken line. As a result, the actual output electric power Pa_act of the DC power supply 10a increases in a stepwise manner according to the value corresponding to the electric power command value Pa* before the compensation, and the electric deviation of the DC power supply 10a is almost eliminated.

Corresponding to the elimination of the electric power deviation of the DC power supply 10a, as shown in FIG. 19, the actual output electric power Pb_act of the DC power supply 10b decreases in a stepwise manner to be almost equal to the voltage command value Pb*. In other words, the electric power deviation of the DC power supply 10b due to the sensor characteristics or the like on the DC power supply 10a side can be almost eliminated.

Figure 21:
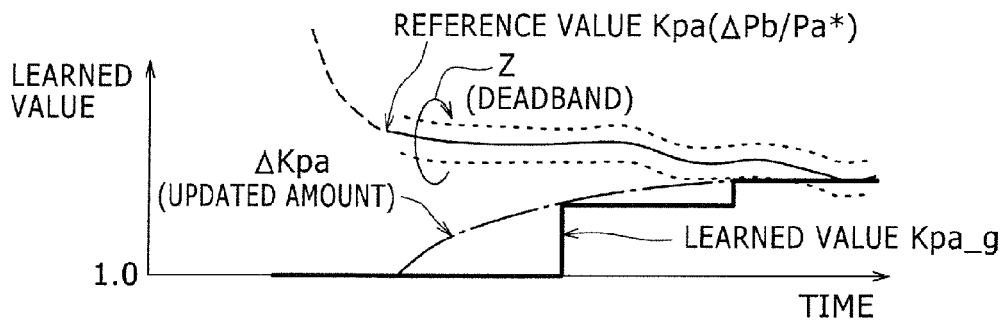
FIG. 21 is a graph showing that, in the electric power deviation compensation control in FIG. 18, a learned value is arranged to get closer to a reference value.

FIG. 21 is a graph showing how the learned value Kpa_g is updated and approaches the reference value Kpa. As referring to FIG. 21, the learned value Kpa_g increases in a step-wise manner at a predetermined time interval by an addition of the update amount ΔKpa such that the learned value Kpa_g is close to the reference value Kpa. Such a learned value Kpa_g approaching the reference value Kpa indicates that the electric power deviation ΔPb of the DC power supply 10b which is used to calculate the reference value Kpa is close to 0.

It is preferable that by setting a deadband Z so as to include the reference value Kpa in the band, the electric power deviation compensation control is finished when the learned value Kpa_g is updated to be within this deadband Z. The deadband Z may be set as ±α % including the reference value Kpa at the center. By setting such a deadband Z, the electric power deviation compensation control may be finished earlier, thereby reducing the control load.

As described above, in the power supply system 1 according to the present embodiment, by performing the electric power deviation compensation control described by reference to FIG. 18, it becomes possible to appropriately modify the electric power distribution between the DC power supplies 10a, 10b so as to eliminate the electric power deviation due to the sensor characteristics or the like on the electric power controlled side. In this way, it becomes possible to prevent the actual output electric power Pb_act of the DC power supply 10b on the voltage controlled side from being continuously overdischarged beyond the dischargeable limit value Pbout. As a result, the deterioration of the DC power supply 10b on the voltage controlled side can be restricted.

It should be noted that the present invention is not be limited to the configurations in the above-described embodiments and their variations. Various changes and modifications are possible within the scope and the equivalent scope of the claims of the present application.

Figure 22:
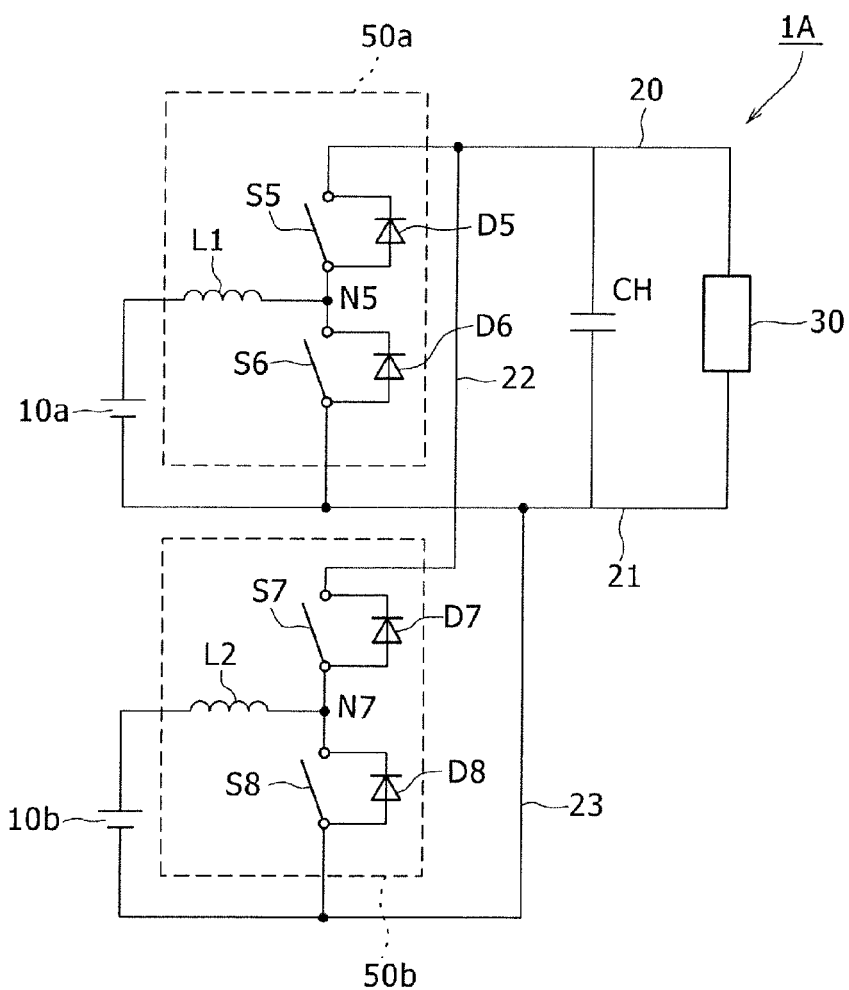
FIG. 22 is a diagram showing another exemplary configuration of a power supply system according to an embodiment of the present invention.

For example, the above power supply system 1 is described to have a configuration which is switchable between the series connection and the parallel connection of the two DC power supplies 10a, 10b to the electric power line 20 by controlling the ON and OFF of the switching elements S1 to S4. However, the present invention is not limited to such a configuration. As shown in FIG. 22, because the electric power converters 50a, 50b are respectively provided with the DC power supplies 10a, 10b such that the electric power converters 50a, 50b can be independently controlled, the present invention may be applied to a power supply system 1A in which the DC power supplies 10a, 10b are connected in parallel to the electric power line 20 via the electric power converters 50a, 50b.

As shown in FIG. 22, the electric power converter 50a for the DC power supply 10a includes a reactor L1 which has one end connected to a positive terminal of the DC power supply 10a, a switching element S5 serving as an upper arm element connected between a node N5 connected to the other end of the reactor L1 and the electric power line 20, and a switching element S6 serving as a lower arm element connected between the node N5 and a ground wire 21. The switching elements S5, S6 respectively include diodes D5, D6 connected in anti-parallel.

Similarly, the electric power converter 50b for the DC power supply 10b includes a reactor L2 which has one end connected to a positive terminal of the DC power supply 10b, a switching element S7 serving as an upper arm element connected between a node N7 connected to the other end of the reactor L2 and the electric power line 22, and a switching element S8 serving as a lower arm element connected between the node N7 and a ground wire 23. The switching elements S7, S8 respectively include diodes D7, D8 connected in anti-parallel such that the electric power line 22 is connected to the electric power line 20 on the DC power supply 10a side and the ground wire 23 is connected to the ground wire 21 on the DC power supply 10a side. Other configurations of the power supply system 1A are identical to that of the above-described embodiment.

In the power supply system 1A shown in FIG. 22, it is impossible to switch the connection of the DC power supplies 10a, 10b to the series connection. Therefore, among the operation modes shown in FIG. 3 in the above embodiment, the SB mode and the SD mode are not applicable. However, the other operation modes are applicable and the electric power converter control can be performed in a similar manner as in the above embodiment. Specifically, when the electric power converter 50b on the DC power supply 10b side is used for voltage control, while the electric power converter 50a on the DC power supply 10a side is used for electric power control, electric power deviation control similar to that of the above embodiment can be performed.

Further, in the power supply system 1A, the PBD mode can be performed by fixing the switching element S7 in the electric power converter 50b to ON and applying the DC-DC conversion for the electric power converter 50a. It should be noted that, in the power supply system 1a, the DC power supply 10b may be directly connected to the electric power line 20 and the ground wire 21 by omitting the electric power converter 50b. In this case, the PBD mode similar to the one for the above-described power supply system 1 can be performed.

REFERENCE SIGNS LIST 1, 1A power supply system; 10a, 10b DC power supply; 11a, 11b, 11c voltage sensor; 12a, 12b electric current sensor; 20, 22 electric power line; 21, 23 ground wire; 30 load, 32 inverter; 35 motor generator; 36 power transmission gear; 37 drive wheel; 40 controller; 50, 50a, 50b electric power converter; 80 to 83, 87 to 89 electric current path; 100 power manager; 110 electric power deviation compensation processor; 120 output state determining unit; 130 reference value processor; 140 counter; 150 learned value processor; 160 electric power command compensator; 200 electric power controller; 210 deviation calculator; 220 control calculator; 230 first limiter; 240 electric power distributer; 250 circulating electric power adder; 260 second limiter; 270 subtractor; 300, 310 electric current controlling unit; 302, 312 electric current command generator; 304, 314 deviation calculator; 306, 316 control calculator; 308, 318 FF adder; 400 PWM controlling unit; 410 carrier wave generator; CH smoothing capacitor; D1 to D8 diode; Ia, Ib, ILa, ILb electric current; Ia*, Ib* electric current command value; k electric power distribution ratio; Kpa reference value; Kpa_sm smoothed reference value; Kpa_g learned value; L1, L2 reactor; N1, N2, N3, N5, N7 node; Pa, Pb output electric power; Pa*, Pb* electric power command value; Pa_act actual output electric power; Pain, Pbin chargeable limit; Paout, Pbout dischargeable limit; Par electric power; ΔPb electric power deviation or difference; PH, PHr total electric power; PH* total electric power command value; PHmax electric power upper limit or maximum value; PHmin electric power lower limit; PHr total electric power; Pr circulating electric power or circulating electric power value; Ra, Rb internal resistance; S1 to S8 switching element; SDa, SDb, SDc control pulse signal; SG1 to SG4 control signal; Ta, Tb temperature; Va, Vb voltage; VH output voltage; VH* voltage command value; VHmax upper limit voltage; VHrq load request voltage; VR1 to VR3 voltage range; and ΔVH voltage deviation.

The invention claimed is:

1. A power supply system comprising:
a load;
an electric power line connected to the load;
a first DC power supply and a second DC power supply which are capable of supplying electric power to the load;
an electric power converter connected to at least one of connections between the first DC power supply and the electric power line and between the second DC power supply and the electric power line; and
an electronic control unit configured to control an operation of the electric power converter,
wherein the first DC power supply and the second DC power supply are connected in parallel to the electric power line and the first DC power supply serves as a power supply for an electric power control for the electric power line, while the second DC power supply serves as a power supply for a voltage control for the electric power line; and
the electronic control unit is configured to set a difference between an electric power requested by the load and a target output electric power of the first DC power supply as a target output electric power of the second DC power supply, and the electronic control unit is configured to compensate the target output electric power of the first DC power supply in accordance with a difference between an actual output electric power of the second DC power supply and the target output electric power of the second DC power supply.

2. The power supply system according to claim 1, wherein the electronic control unit is configured to compensate the target output electric power of the first DC power supply by obtaining the difference between the actual output electric power of the second DC power supply and the target output electric power of the second DC power supply when an output state of the first DC power supply is stable.

3. The power supply system according to claim 2, wherein the electronic control unit is configured to obtain the difference between the actual output electric power of the second DC power supply and the target output electric power of the second DC power supply by determining that the output state of the first DC power supply is stable when the target output electric power of the first DC power supply is equal to or larger than a predetermined value and a time change ratio of the target output electric power of the first DC power supply is equal to or less than a predetermined value.

4. The power supply system according to claim 1, wherein the electronic control unit is configured to:
obtain a smoothed reference value by applying a smoothing process to a reference value which is obtained by dividing the difference between the actual output electric power of the second DC power supply and the target output electric power of the second DC power supply by the target output electric power of the first DC power supply,
calculate a learned value which is used to perform the compensation by using the smoothed reference value, and
compensate the target output electric power of the first DC power supply by using the learned value.

5. The power supply system according to claim 2, wherein the electronic control unit is configured to:
obtain a smoothed reference value by applying a smoothing process to a reference value which is obtained by dividing the difference between the actual output electric power of the second DC power supply and the target output electric power of the second DC power supply by the target output electric power of the first DC power supply,
calculate a learned value which is used to perform the compensation by using the smoothed reference value, and
compensate the target output electric power of the first DC power supply by using the learned value.

6. The power supply system according to claim 3, wherein the electronic control unit is configured to:
obtain a smoothed reference value by applying a smoothing process to a reference value which is obtained by dividing the difference between the actual output electric power of the second DC power supply and the target output electric power of the second DC power supply by the target output electric power of the first DC power supply,
calculate a learned value which is used to perform the compensation by using the smoothed reference value, and
compensate the target output electric power of the first DC power supply by using the learned value.

7. The power supply system according to claim 4, wherein the electronic control unit is configured to:
update the learned value by adding, after applying the smoothing process, a difference between the smoothed reference value and a previous learned value obtained in a previous process to the previous learned value, and
finish the compensation of the target output electric power of the first DC power supply when the updated learned value is in a deadband defining a range including the reference value.

8. The power supply system according to claim 5, wherein the electronic control unit is configured to:
update the learned value by adding, after applying the smoothing process, a difference between the smoothed reference value and a previous learned value obtained in a previous process to the previous learned value, and
finish the compensation of the target output electric power of the first DC power supply when the updated learned value is in a deadband defining a range including the reference value.

9. The power supply system according to claim 6, wherein the electronic control unit is configured to:
update the learned value by adding, after applying the smoothing process, a difference between the smoothed reference value and a previous learned value obtained in a previous process to the previous learned value, and
finish the compensation of the target output electric power of the first DC power supply when the updated learned value is in a deadband defining a range including the reference value.

10. The power supply system according to claim 7, wherein
the electronic control unit is configured to set an upper limit and a lower limit of the updated learned value and performs the compensation of the target output electric power of the first DC power supply when the updated learned value is in a range defined by the upper limit and the lower limit, while performing no compensation when the updated value is out of the range.

11. The power supply system according to claim 8, wherein
the electronic control unit is configured to set an upper limit and a lower limit of the updated learned value and performs the compensation of the target output electric power of the first DC power supply when the updated learned value is in a range defined by the upper limit and the lower limit, while performing no compensation when the updated value is out of the range.

12. The power supply system according to claim 9, wherein
the electronic control unit is configured to set an upper limit and a lower limit of the updated learned value and performs the compensation of the target output electric power of the first DC power supply when the updated learned value is in a range defined by the upper limit and the lower limit, while performing no compensation when the updated value is out of the range.

* * * * *